United States Patent
Mullet et al.

(10) Patent No.: US 9,152,032 B2
(45) Date of Patent: Oct. 6, 2015

(54) HIGH EFFICIENCY MOTORIZED ROLLER SCREEN AND METHOD OF OPERATION

(71) Applicant: HOMERUN HOLDINGS CORPORATION, Pensacola, FL (US)

(72) Inventors: Willis Jay Mullet, Gulf Breeze, FL (US); Yan Rodriguez, Suwanee, GA (US); Ben L. Garcia, Cumming, GA (US); Victoria Baynes Mullet, Gulf Breeze, FL (US); Matthew Warren Kirkland, Cantonment, FL (US)

(73) Assignee: QMotion Incorporated, Pensacola, FL (US)

(*) Notice: Subject to any disclaimer, the term of this patent is extended or adjusted under 35 U.S.C. 154(b) by 80 days.

(21) Appl. No.: 14/072,975

(22) Filed: Nov. 6, 2013

(65) Prior Publication Data
US 2014/0133019 A1    May 15, 2014

Related U.S. Application Data

(63) Continuation-in-part of application No. 14/018,823, filed on Sep. 5, 2013, now Pat. No. 8,947,027, which is a continuation of application No. 13/653,451, filed on Oct. 17, 2012, now Pat. No. 8,575,872, which is a continuation-in-part of application No. 12/711,193, filed on Feb. 23, 2010, now Pat. No. 8,368,328.

(51) Int. Cl.
| | |
|---|---|
| *H02P 1/00* | (2006.01) |
| *H02P 3/00* | (2006.01) |
| *H02P 5/00* | (2006.01) |
| *G03B 21/58* | (2014.01) |
| *G08C 17/02* | (2006.01) |
| *H02P 1/18* | (2006.01) |
| *E06B 9/42* | (2006.01) |
| *E06B 9/72* | (2006.01) |

(Continued)

(52) U.S. Cl.
CPC . *G03B 21/58* (2013.01); *E06B 9/42* (2013.01); *E06B 9/62* (2013.01); *E06B 9/72* (2013.01); *G08C 17/02* (2013.01); *G08C 23/04* (2013.01); *H02P 1/18* (2013.01); *E06B 2009/6818* (2013.01); *E06B 2009/6845* (2013.01); *E06B 2009/6872* (2013.01); *E06B 2009/6881* (2013.01); *G08C 2201/50* (2013.01); *G08C 2201/51* (2013.01)

(58) Field of Classification Search
CPC .................................. E06B 9/40; E06B 9/322
USPC .......................................... 318/255, 265, 286
See application file for complete search history.

(56) References Cited

U.S. PATENT DOCUMENTS

| | | |
|---|---|---|
| 3,631,659 A | 1/1972 | Horowitz et al. |
| 3,853,166 A | 12/1974 | Wrono |

(Continued)

*Primary Examiner* — Erick Glass
(74) *Attorney, Agent, or Firm* — Christopher A. Proskey

(57) ABSTRACT

The invention advantageously provides a deployable screen system that includes a roller tube, a motor/controller unit and a power supply unit. The motor/controller unit is disposed within the roller tube, and includes a bearing, rotatably coupled to a support shaft, and a DC gear motor. The output shaft of the DC gear motor is coupled to the support shaft such that the output shaft and the support shaft do not rotate when the support shaft is attached to the mounting bracket. The deployable screen system is operable by tugging, manual movement and wireless control. The DC gear motor is underpowered by a plurality of batteries positioned within the roller tube. In this way a novel, useful and nonobvious deployable screen system is presented.

21 Claims, 32 Drawing Sheets

(51) Int. Cl.
*G08C 23/04* (2006.01)
*E06B 9/62* (2006.01)
*E06B 9/68* (2006.01)

(56) References Cited

U.S. PATENT DOCUMENTS

| | | | |
|---|---|---|---|
| 3,930,738 A | 1/1976 | Thuss et al. |
| 4,096,903 A | 6/1978 | Ringle, III |
| 4,160,348 A | 7/1979 | Chapman et al. |
| 4,171,845 A | 10/1979 | Hirsch |
| 4,223,714 A | 9/1980 | Weinreich et al. |
| 4,399,855 A | 8/1983 | Volfson |
| 4,427,050 A | 1/1984 | Toppen |
| RE31,793 E | 1/1985 | Berman et al. |
| 4,495,978 A | 1/1985 | Carroll |
| 4,572,467 A | 2/1986 | Farrell |
| 4,731,965 A | 3/1988 | Jensen |
| 4,766,941 A | 8/1988 | Sloop et al. |
| 4,807,686 A | 2/1989 | Schnebly et al. |
| 4,831,509 A | 5/1989 | Jones et al. |
| 4,865,107 A | 9/1989 | Dube |
| 4,956,588 A | 9/1990 | Ming |
| 4,979,582 A | 12/1990 | Forster |
| 5,054,605 A | 10/1991 | Bavis |
| 5,123,079 A | 6/1992 | Tanii et al. |
| 5,133,330 A | 7/1992 | Sharp |
| 5,133,399 A | 7/1992 | Hiller et al. |
| 5,271,446 A | 12/1993 | Hwang |
| 5,278,480 A | 1/1994 | Murray |
| 5,419,010 A | 5/1995 | Mullet |
| 5,434,487 A | 7/1995 | Long et al. |
| 5,445,209 A | 8/1995 | Lichy |
| 5,462,105 A | 10/1995 | Supernak |
| 5,467,808 A | 11/1995 | Bell |
| 5,482,100 A | 1/1996 | Kuhar |
| 5,509,239 A | 4/1996 | Fullwood |
| 5,547,008 A | 8/1996 | Sullivan |
| 5,566,736 A | 10/1996 | Crider et al. |
| 5,655,342 A | 8/1997 | Guillemet et al. |
| 5,655,343 A | 8/1997 | Seals |
| 5,714,855 A | 2/1998 | Domel et al. |
| 5,729,103 A | 3/1998 | Domel et al. |
| 5,752,557 A | 5/1998 | Crider et al. |
| 5,785,105 A | 7/1998 | Crider et al. |
| 5,793,174 A | 8/1998 | Kovach et al. |
| 5,813,447 A | 9/1998 | Lysyj |
| RE36,058 E | 1/1999 | Sokol |
| 5,883,480 A | 3/1999 | Domel et al. |
| 5,889,377 A | 3/1999 | Mao |
| 5,905,442 A | 5/1999 | Mosebrook et al. |
| 5,907,227 A | 5/1999 | Domel et al. |
| 5,929,580 A | 7/1999 | Mullet et al. |
| 5,960,847 A | 10/1999 | Crider et al. |
| 5,990,646 A | 11/1999 | Kovach et al. |
| 6,020,829 A | 2/2000 | Hormann |
| 6,055,885 A | 5/2000 | Shea |
| 6,060,852 A | 5/2000 | Domel et al. |
| 6,069,465 A | 5/2000 | de Boois et al. |
| 6,082,433 A | 7/2000 | Vafaie et al. |
| 6,125,907 A | 10/2000 | Tokuyama et al. |
| 6,144,177 A | 11/2000 | Mao |
| 6,181,089 B1 | 1/2001 | Kovach et al. |
| 6,201,364 B1 | 3/2001 | Will et al. |
| 6,212,221 B1 | 4/2001 | Wakayama et al. |
| 6,259,218 B1 | 7/2001 | Kovach et al. |
| 6,286,579 B1 | 9/2001 | Gottschalk |
| 6,369,530 B2 | 4/2002 | Kovach et al. |
| 6,376,832 B1 | 4/2002 | Smith et al. |
| 6,433,498 B1 | 8/2002 | Domel et al. |
| 6,489,169 B1 | 12/2002 | Cohen et al. |
| 6,497,267 B1 | 12/2002 | Azar et al. |
| 6,550,733 B1 | 4/2003 | Lassen et al. |
| 6,606,072 B1 | 8/2003 | Glissman et al. |
| 6,708,750 B2 | 3/2004 | Collett et al. |
| 6,733,413 B2 | 5/2004 | Lagarde et al. |
| 6,850,017 B1 | 2/2005 | Domel et al. |
| 6,870,338 B2 | 3/2005 | Walker et al. |
| 6,959,748 B2 | 11/2005 | Hudoba |
| 6,967,565 B2 | 11/2005 | Lingemann |
| 6,979,962 B2 | 12/2005 | Cavarec et al. |
| 7,137,530 B2 | 11/2006 | Chirnomas |
| 7,193,502 B2 | 3/2007 | Vandrunen et al. |
| 7,240,716 B2 | 7/2007 | Nichols, Jr. et al. |
| 7,259,485 B2 | 8/2007 | Cavarec et al. |
| 7,281,561 B2 | 10/2007 | Anderson et al. |
| 7,299,848 B2 | 11/2007 | Streib et al. |
| 7,346,016 B2 | 3/2008 | Nielsen et al. |
| 7,356,041 B2 | 4/2008 | Nielsen et al. |
| 7,389,806 B2 | 6/2008 | Kates |
| 7,438,111 B2 | 10/2008 | Grimes et al. |
| 7,599,612 B2 | 10/2009 | Moseley et al. |
| 7,719,215 B2 | 5/2010 | Meewis et al. |
| 7,723,939 B2 | 5/2010 | Carmen, Jr. |
| 7,923,948 B2 | 4/2011 | Rodas et al. |
| 8,125,167 B2 | 2/2012 | Mullet et al. |
| 2002/0190678 A1 | 12/2002 | Huber et al. |
| 2004/0169116 A1 | 9/2004 | Nogare et al. |
| 2005/0205217 A1 | 9/2005 | Harper et al. |
| 2005/0206334 A1 | 9/2005 | Cavarec et al. |
| 2005/0211391 A1 | 9/2005 | Varley et al. |
| 2006/0000936 A1 | 1/2006 | Caamano et al. |
| 2006/0086874 A1 | 4/2006 | Habel et al. |
| 2007/0060214 A1 | 3/2007 | Sung et al. |
| 2007/0261801 A1 | 11/2007 | Mullet et al. |
| 2008/0128097 A1 | 6/2008 | Yu et al. |
| 2009/0127369 A1 | 5/2009 | Mullet et al. |

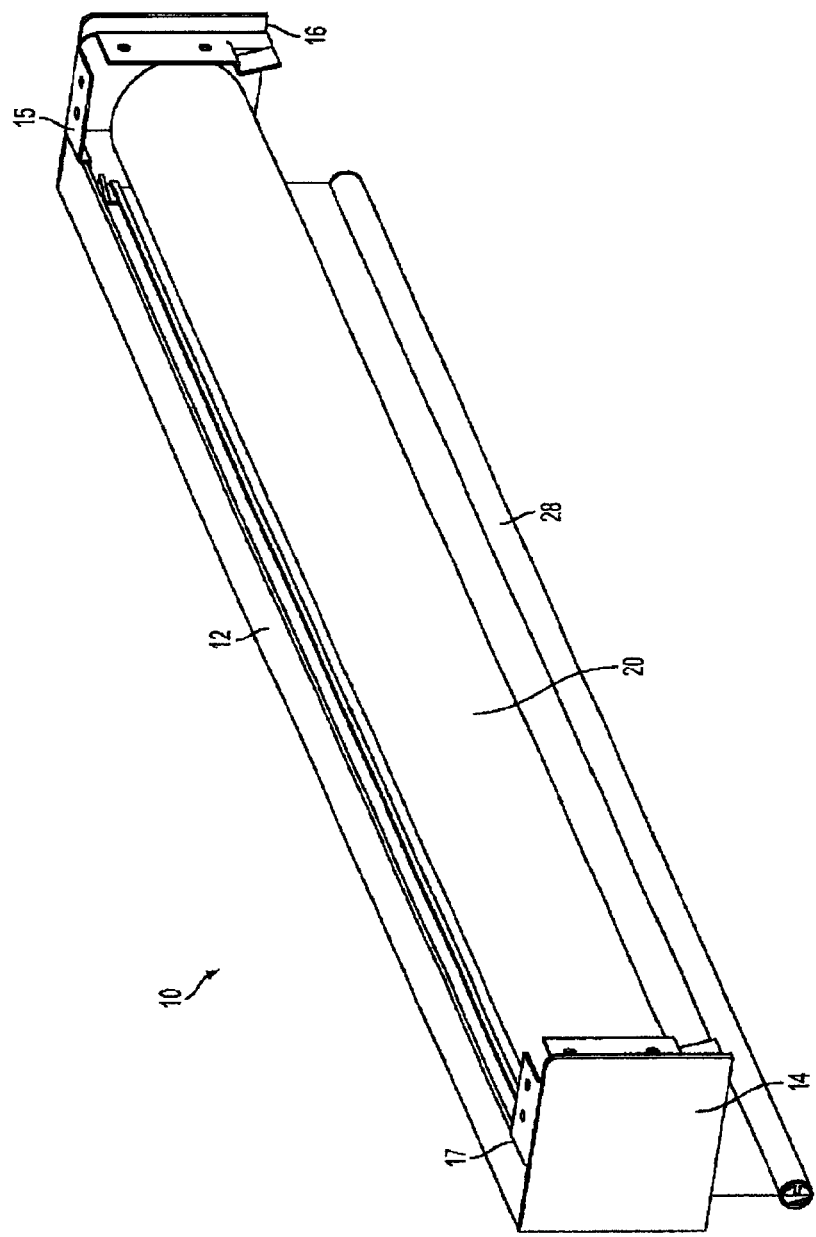

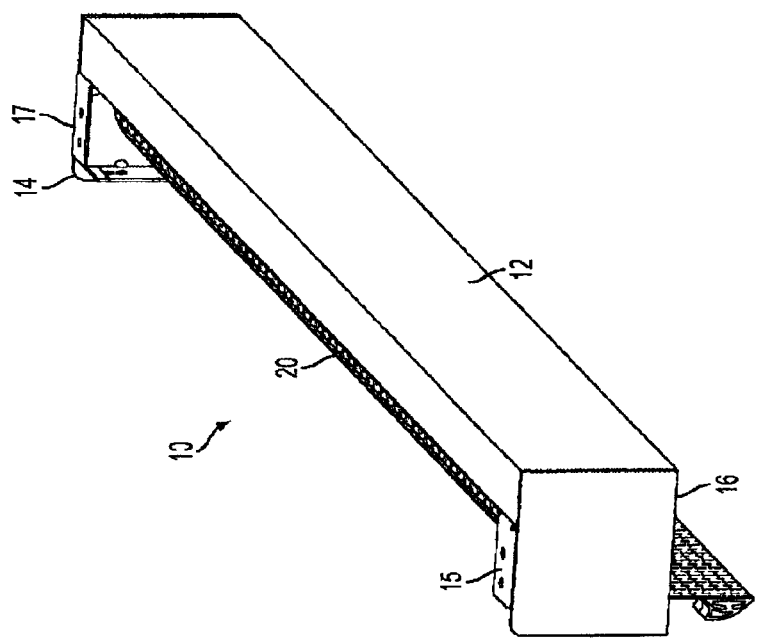
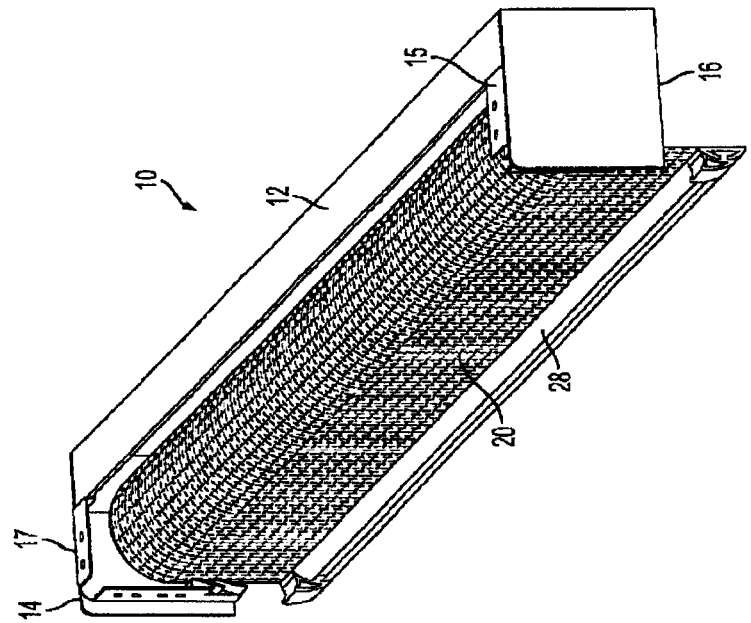

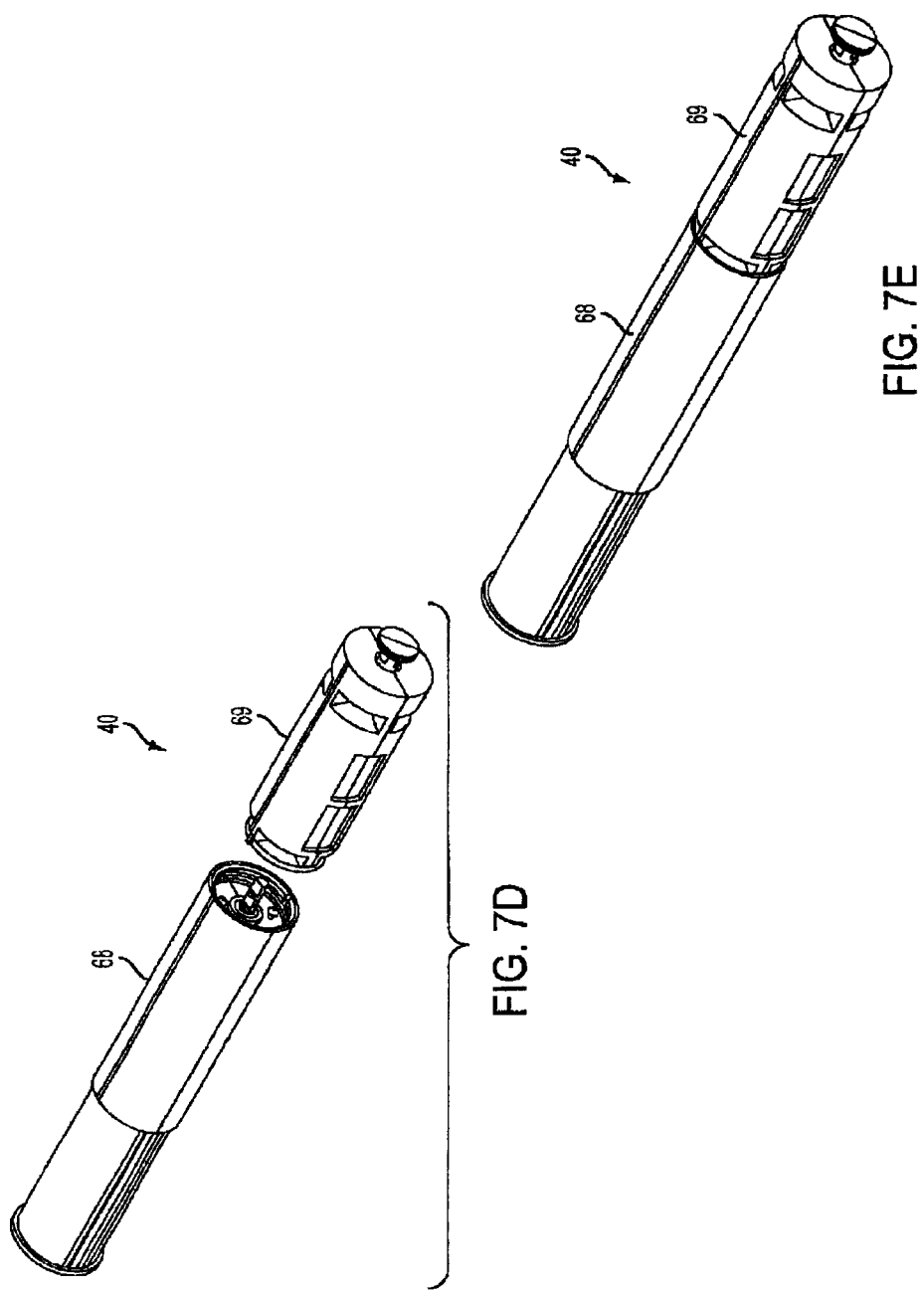

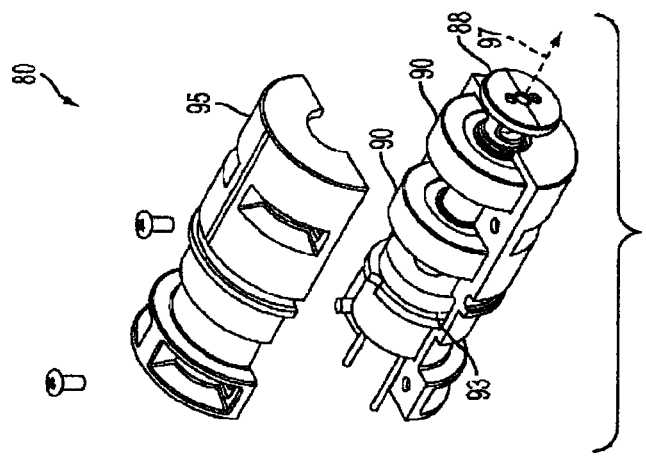
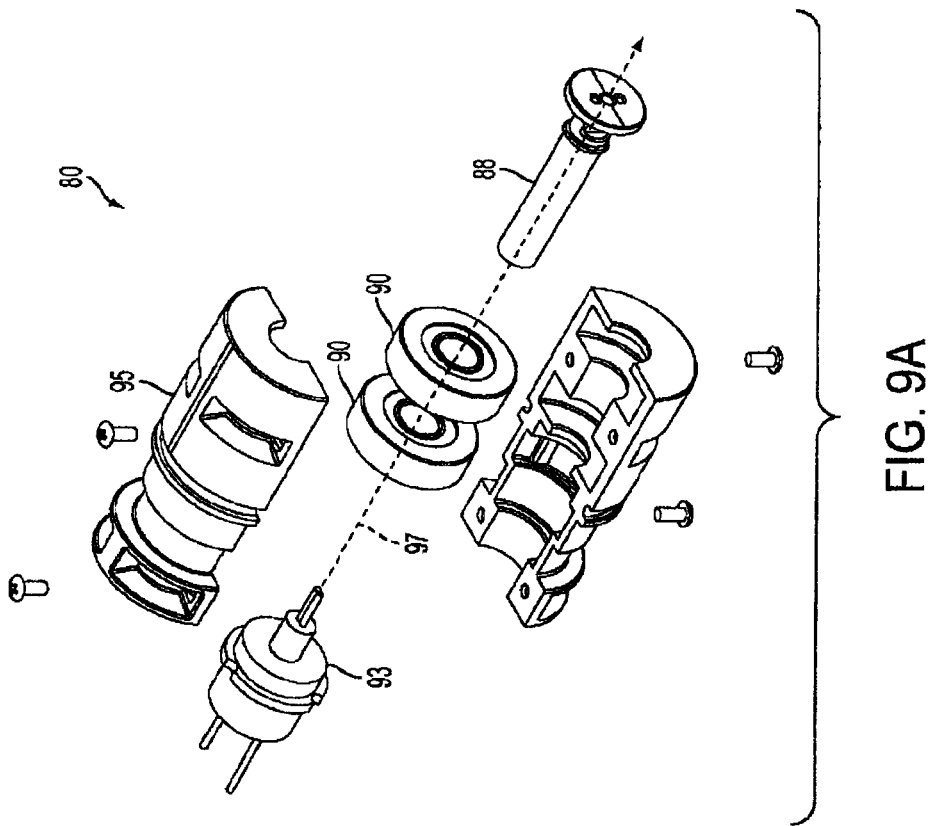

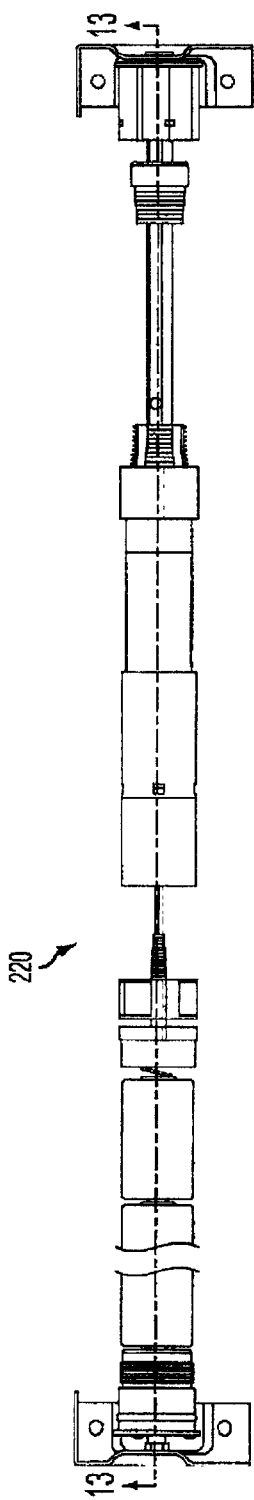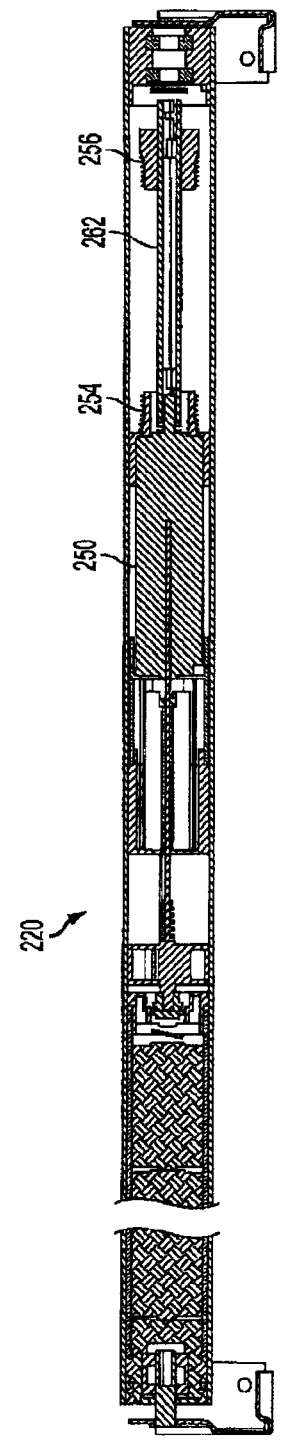

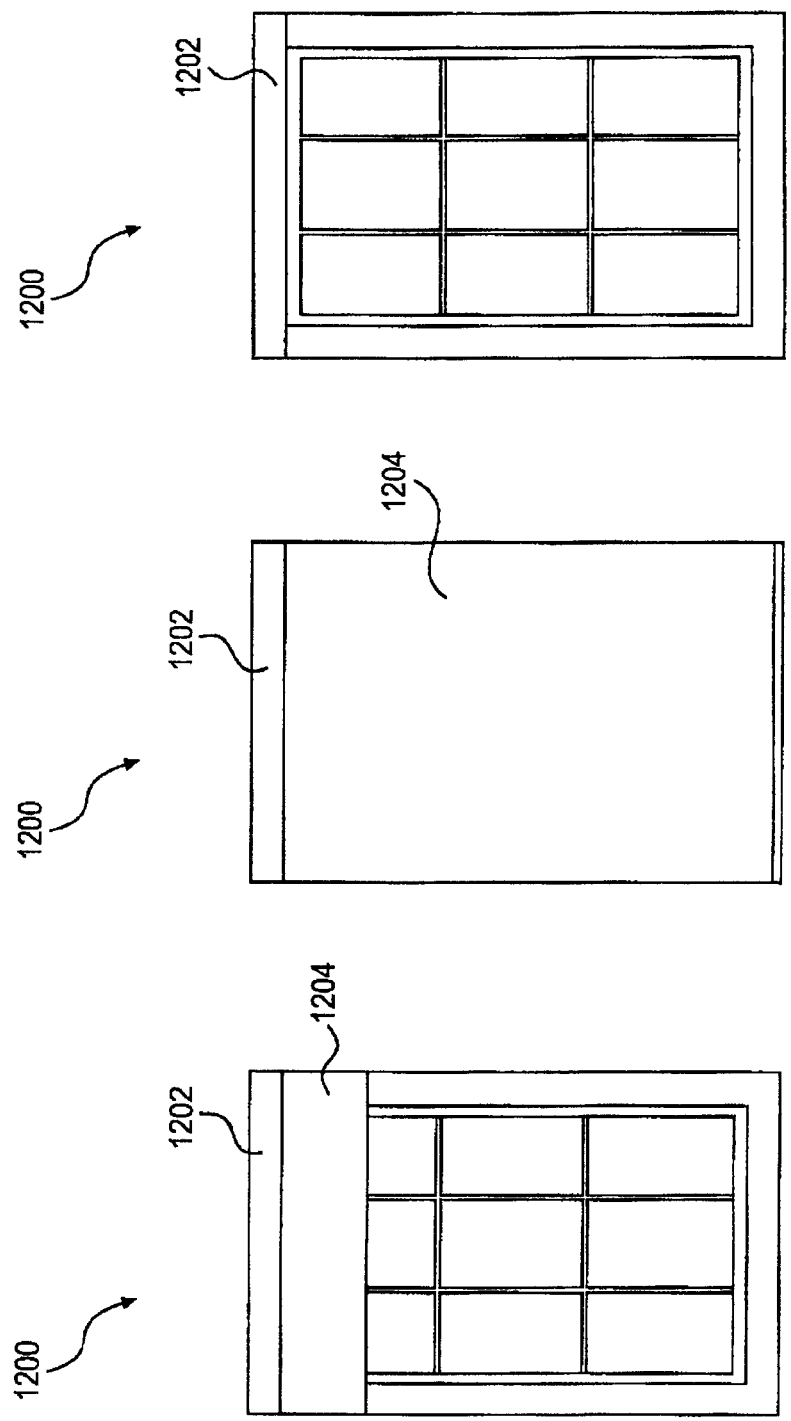

HIGH EFFICIENCY MOTORIZED ROLLER SCREEN AND METHOD OF OPERATION

CROSS REFERENCE TO A RELATED APPLICATION

This application is a continuation-in-part of U.S. Ser. No. 14/018,823 filed Sep. 5, 2013 which is a continuation of U.S. Ser. No. 13/653,451 filed Oct. 17, 2012, now U.S. Pat. No. 8,575,872 issued Nov. 5, 2013, which is a continuation-in-part of U.S. Ser. No. 12/711,193 filed Feb. 23, 2010, now U.S. Pat. No. 8,368,328 issued Feb. 5, 2013.

FIELD OF THE INVENTION

This invention relates to a motorized screen. More specifically, this invention relates to a high-efficiency roller screen and method of operation.

BACKGROUND OF THE INVENTION

Screens for projectors, such as projection televisions, are old and well known in the art. In their simplest form, these screens were formed of a simple panel of fabric, such as a piece of white material ("screen material"), hung from a ceiling or wall. While effective, these installations were somewhat permanent and in some applications it was desirable to have these screens be less-permanent, or removable fixtures. As a result, an array of deployable screens were developed.

One form of deployable screens is made by attaching the screen material to a rotating rod or tube. When the tube or rod is rotated, the screen material is rolled-up around, or unrolled from, the rotating tube thereby quickly and easily deploying or retracting the screen material. Many of these systems are operated manually by way of various manual operating systems such as pulling a drawstring connected to the bottom of the panel of fabric, or pulling a looped cord connected to a transfer mechanism that causes the rotating tube to rotate. While manual operation is effective, in many applications it is undesirable as it is inconvenient to manually operate the system. In addition, it may be aesthetically displeasing to have cords hanging down from the system in certain applications.

As a solution to manual operation, systems were developed that operate by activating a motor. Conventionally, these systems include an electric motor connected to the rotating tube that is hard wired to the buildings electrical system. This arrangement provides a constant and essentially unlimited amount of power to the system which allows for use of motors that produce a lot of power at the cost of consuming a high amount of energy. While these systems are effective, they have their disadvantages as the requirement for hard-wiring often requires advanced planning, expensive electrical work or unsightly exposed wires. Manufacturers of various deployable screen systems include Da-Lite of Warsaw, Ind.; Stewart Filmscreen of Torrance, Calif.; Vutec of Coral Springs, Fla.; Elite Screens Inc. of Garden Grove, Calif. among others.

For the reasons stated above, and for other reasons stated below, which will become apparent to those skilled in the art upon reading and understanding the specification, there is a need in the art for an improved motorized roller screen and method of use.

Thus, it is a primary object of the invention to provide a motorized battery powered roller screen that improves upon the state of the art.

Another object of the invention is to provide a motorized battery powered roller screen that does not require hard wiring.

Yet another object of the invention is to provide a motorized battery powered roller screen that provides long battery life.

Another object of the invention is to provide a motorized battery powered roller screen that is well balanced/counterbalanced.

Yet another object of the invention is to provide a motorized battery powered roller screen that operates by way of a tug and by way of manual movement by directly pulling the screen.

Another object of the invention is to provide a motorized battery powered roller screen that operates by way of a remote.

Yet another object of the invention is to provide a motorized battery powered roller screen that has a motor positioned in the rotating tube.

Another object of the invention is to provide a motorized battery powered roller screen that has batteries positioned in the rotating tube.

Yet another object of the invention is to provide a motorized battery powered roller screen wherein the batteries are easily removed and replaced.

Another object of the invention is to provide a motorized battery powered roller screen that is inexpensive.

Yet another object of the invention is to provide a motorized battery powered roller screen that that has a long useful life.

Another object of the invention is to provide a motorized battery powered roller screen that is durable.

Yet another object of the invention is to provide a motorized battery powered roller screen that has a simple design.

Another object of the invention is to provide a motorized battery powered roller screen that is simple to use.

Yet another object of the invention is to provide a motorized battery powered roller screen that has a minimum number of parts.

Another object of the invention is to provide a motorized battery powered roller screen that operates quietly.

Yet another object of the invention is to provide a motorized battery powered roller screen that has long battery life.

These and other objects, features, or advantages of the invention will become apparent from the specification and claims.

Comparison to Window Coverings:

In this way, deployable screens share many similarities to roller-shade-type window treatments. A common window covering during the 19th century, a roller shade is simply a rectangular panel of fabric, or other material, that is attached to a cylindrical, rotating tube. The shade tube is mounted near the header of the window such that the shade rolls up upon itself as the shade tube rotates in one direction, and rolls down to cover the a desired portion of the window when the shade tube is rotated in the opposite direction.

A control system, mounted at one end of the shade tube, can secure the shade at one or more positions along the extent of its travel, regardless of the direction of rotation of the shade tube. Simple mechanical control systems include ratchet-and-pawl mechanisms, friction brakes, clutches, etc. To roll the shade up and down, and to position the shade at intermediate locations along its extend of travel, ratchet-and-pawl and friction brake mechanisms require the lower edge of the shade to be manipulated by the user, while clutch mechanisms include a control chain that is manipulated by the user.

Not surprisingly, motorization of the roller shade was accomplished, quite simply, by replacing the simple, mechanical control system with an electric motor that is directly coupled to the shade tube. The motor may be located inside or outside the shade tube, is fixed to the roller shade support and is connected to a simple switch, or, in more sophisticated applications, to a radio frequency (RF) or infrared (IR) transceiver, that controls the activation of the motor and the rotation of the shade tube.

Many known motorized roller shades provide power, such as 120 VAC, 220/230 VAC 50/60 Hz, etc., to the motor and control electronics from the facility in which the motorized roller shade is installed. Recently-developed battery-powered roller shades provide installation flexibility by removing the requirement to connect the motor and control electronics to facility power. The batteries for these roller shades are typically mounted within, above, or adjacent to the shade mounting bracket, headrail or fascia. Unfortunately, these battery-powered systems suffer from many drawbacks, including, for example, high levels of self-generated noise, inadequate battery life, inadequate or nonexistent counterbalancing capability, inadequate or nonexistent manual operation capability, inconvenient installation requirements, and the like.

Moreover, setting the operational range of a motorized shade or blind is necessary to assure control of solar gain and privacy. Therefore many known motorized roller shade designs have taken several approaches, for example, external limit switches, internal limit switches, and hard stops which stall the motor at the limits. Limit switches have inherent drawbacks as they can be expensive and can fail over time. External limit switches are typically installed during the installation which can be time consuming whereas internal limit switches are installed into the control system of the shade or blind and can be operated by lead screws and nuts or cams also adding cost. Hard stops require the installer to run a set up routine after the shade or blind is installed and provide a satisfactory way to set the upper and lower travel limits which define the operational range of the shade or blind. Typical drawbacks to hard stops include the noise, the wear and tear on the components and in the case of battery power supplies and the use of additional current to stall the motor which shorten the battery life.

SUMMARY OF THE INVENTION

Embodiments of the invention advantageously provide a deployable screen system that includes a roller tube, screen material connected to the roller tube and a motor/controller unit and a power supply unit. The motor/controller unit is disposed within the roller tube, and includes a bearing, rotatably coupled to a support shaft, and a DC gear motor. The output shaft of the DC gear motor is coupled to the support shaft such that the output shaft and the support shaft do not rotate when the support shaft is attached to the mounting bracket.

Other embodiments of the invention provide an internal motor/controller unit for a deployable screen system that includes a bearing rotatably coupled to a support shaft, a DC gear motor and a DC gear motor mount that is attachable to the inner surface of the roller tube. The output shaft of the DC gear motor is coupled to the support shaft such that the output shaft and the support shaft do not rotate when the support shaft is attached to the mounting bracket.

Further embodiments of the invention provide an internal power supply unit for a deployable screen system that includes a battery tube, an outer end cap and an inner end cap. The outer end cap includes a bearing that is rotatably coupled to a support shaft that is attachable to a mounting bracket. The outer and inner end caps are attachable to the inner surface of the shade tube.

In yet another embodiment of the invention, a deployable screen system is presented that includes a pre-tensioned counterbalance assembly, and an assembly including an internal stop for stopping the rotation of the roller tube. There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 1A and 1B depict complementary isometric views of a motorized roller shade assembly, in accordance with embodiments of the present invention.

FIGS. 2A and 2B depict complementary isometric views of a motorized roller shade assembly, in accordance with embodiments of the present invention.

FIGS. 7C, 7D and 7E depict isometric views of a motor/controller unit according to another alternative embodiment of the present invention.

FIGS. 9A and 9B depict exploded, isometric views of a power supply unit according to an alternative embodiment of the present invention.

FIG. 12 presents a front view of a motorized roller shade, according to an embodiment of the present invention.

FIG. 13 presents a sectional view along the longitudinal axis of the motorized roller shade depicted in FIG. 12.

FIG. 26 is a plan view of a window with a roller shade assembly in accordance with an embodiment of the present invention wherein the shade assembly is deployed in a first position.

FIG. 27 is a plan view of the window and roller shade assembly depicted in FIG. 26 wherein the roller shade assembly is deployed in a second or closed position.

FIG. 28 is a plan view of the window or roller shade assembly depicted in FIGS. 26 and 27 wherein the shade assembly is deployed to third or open position.

DETAILED DESCRIPTION

Figure 1B:
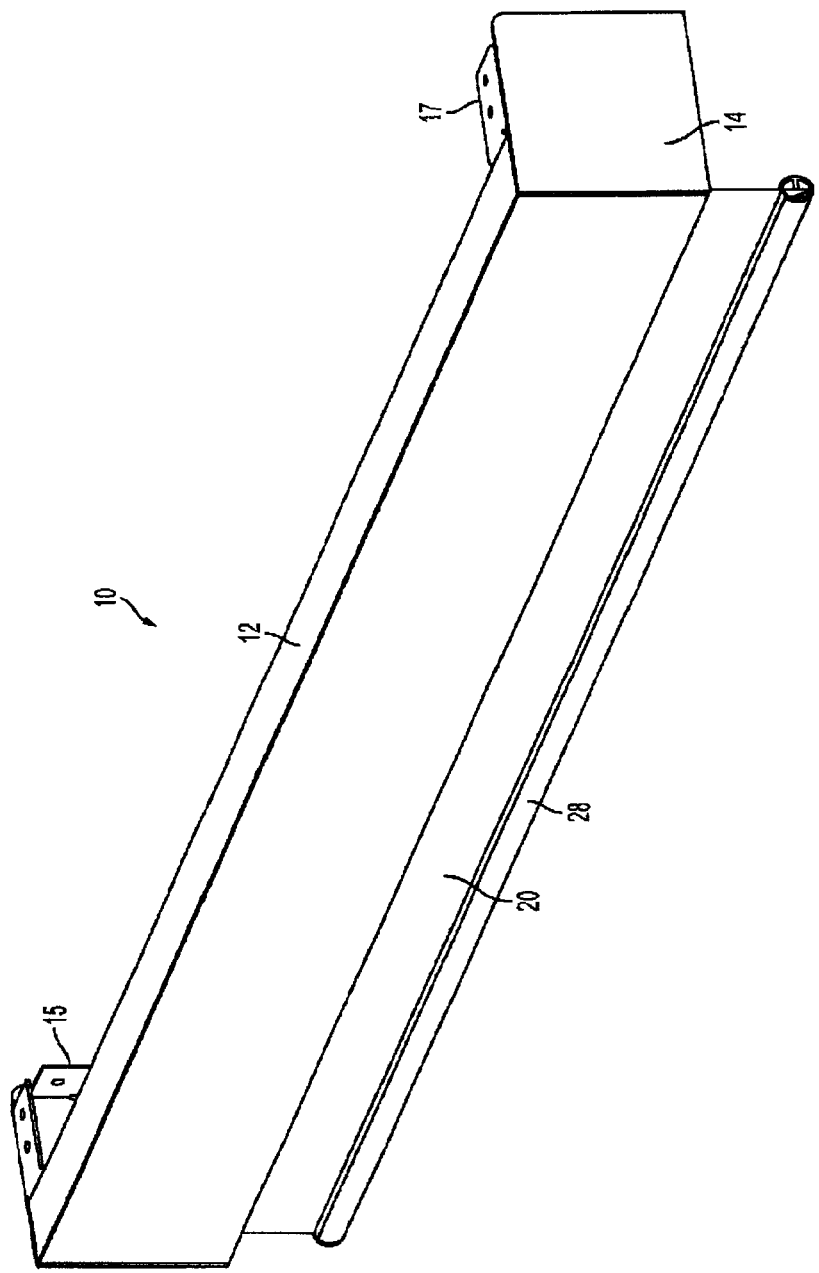

The invention will now be described with reference to the drawing figures, in which like reference numerals refer to like parts throughout. The term "shade" as used herein describes any flexible material, such as a shade, a curtain, a screen, etc., that can be deployed from, and retrieved onto, a storage tube.

Embodiments of the present invention provide a remote controlled motorized roller shade in which the batteries, DC gear motor, control circuitry are entirely contained within a shade tube that is supported by bearings. Two support shafts are attached to respective mounting brackets, and the bearings rotatably couple the shade tube to each support shaft. The output shaft of the DC gear motor is fixed to one of the support shafts, while the DC gear motor housing is mechanically coupled to the shade tube. Accordingly, operation of the DC gear motor causes the motor housing to rotate about the fixed DC gear motor output shaft, which causes the shade tube to rotate about the fixed DC gear motor output shaft as well. Because these embodiments do not require external wiring for power or control, great flexibility in mounting, and re-mounting, the motorized roller shade is provided.

Encapsulation of the motorization and control components within the shade tube, combined with the performance of the bearings and enhanced battery capacity of the DC gear motor configuration described above, greatly increases the number of duty cycles provided by a single set of batteries and provides a highly efficient roller shade. Additionally, encapsulation advantageously prevents dust and other contaminants from entering the electronics and the drive components.

In an alternative embodiment, the batteries may be mounted outside of the shade tube, and power may be provided to the components located within the shade tube using commutator or slip rings, induction techniques, and the like. Additionally, the external batteries may be replaced by any external source of DC power, such as, for example, an AC/DC power converter, a solar cell, etc.

Figure 3:
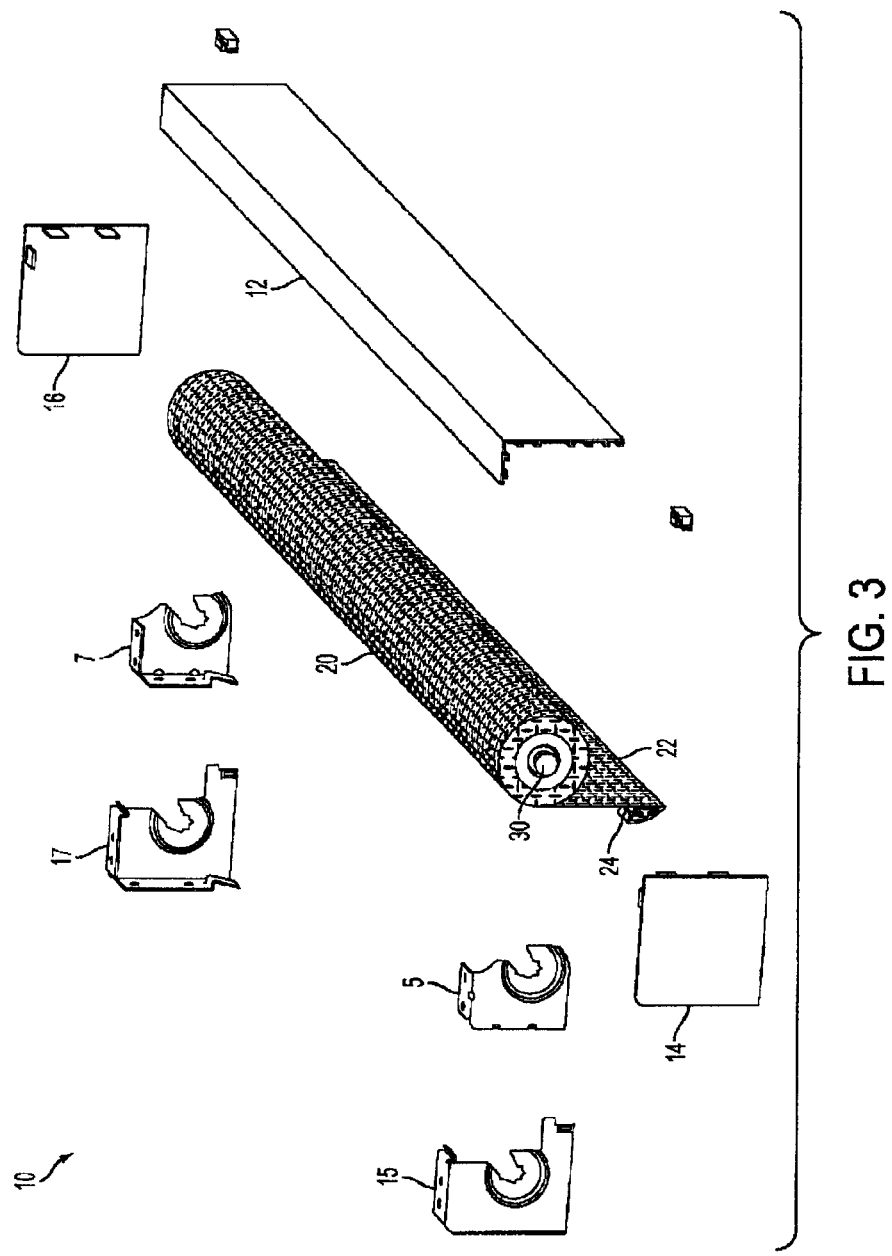
FIG. 3 depicts an exploded, isometric view of the motorized roller shade assembly depicted in FIG. 2B.

FIGS. 1A and 1B depict complementary isometric views of a motorized roller shade assembly 10 having a reverse payout, in accordance with embodiments of the present invention. FIGS. 2A and 2B depict complementary isometric views of a motorized roller shade assembly 10 having a standard payout, in accordance with embodiments of the present invention, while FIG. 3 depicts an exploded, isometric view of the motorized roller shade assembly 10 depicted in FIG. 2B. In one embodiment, motorized roller shade 20 is mounted near the top portion of a window, door, etc., using mounting brackets 5 and 7. In another embodiment, motorized roller shade 20 is mounted near the top portion of the window using mounting brackets 15 and 17, which also support fascia 12. In the latter embodiment, fascia end caps 14 and 16 attach to fascia 12 to conceal motorized roller shade 20, as well as mounting brackets 15 and 17.

Generally, motorized roller shade 20 includes a shade 22 and a motorized tube assembly 30. In a preferred embodiment, motorized roller shade 20 also includes a bottom bar 28 attached to the bottom of shade 22. In one embodiment, bottom bar 28 provides an end-of-travel stop, while in an alternative embodiment, end-of-travel stops 24 and 26 may be provided. As discussed in more detail below, in preferred embodiments, all of the components necessary to power and control the operation of the motorized roller shade 20 are advantageously located within motorized tube assembly 30.

Figure 4:
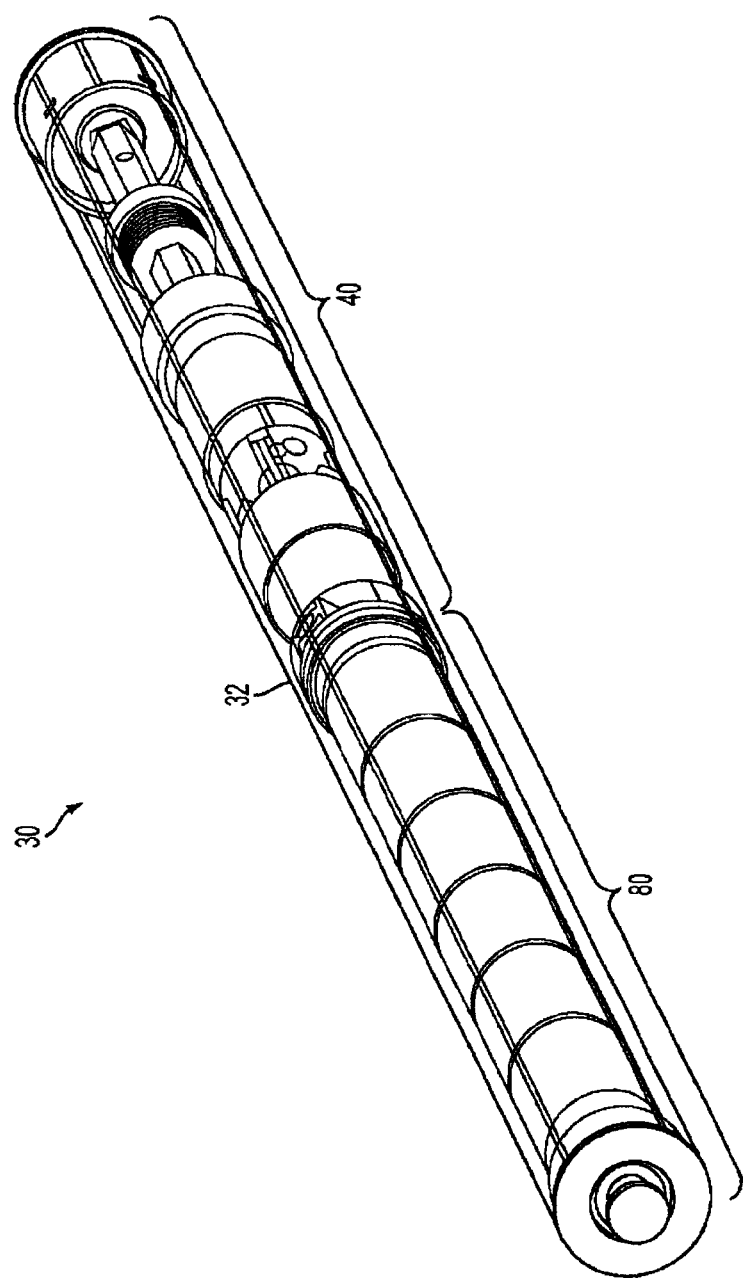
FIG. 4 depicts an isometric view of a motorized tube assembly, according to one embodiment of the present invention.
Figure 5:
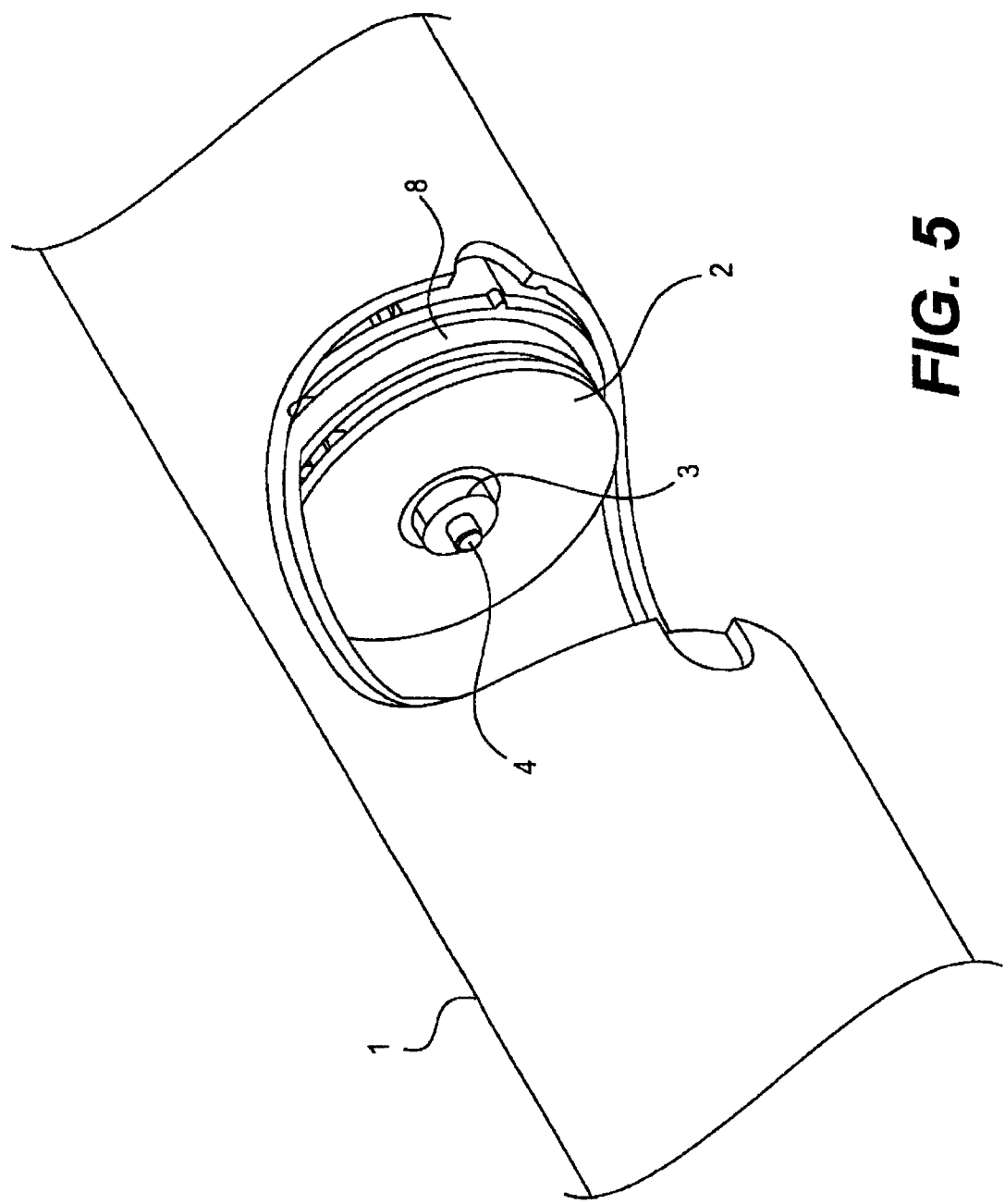
FIG. 5 depicts a partially-exploded, isometric view of the motorized tube assembly depicted in FIG. 4.

FIGS. 4 and 5 depict isometric views of motorized tube assembly 30, according to one embodiment of the present invention. Motorized tube assembly 30 includes a shade tube 32, motor/controller unit 40 and battery tube unit 80. The top of shade 22 is attached to the outer surface of shade tube 32, while motor/controller unit 40 and battery tube unit 80 are located within an inner cavity defined by the inner surface of shade tube 32.

Figure 6:
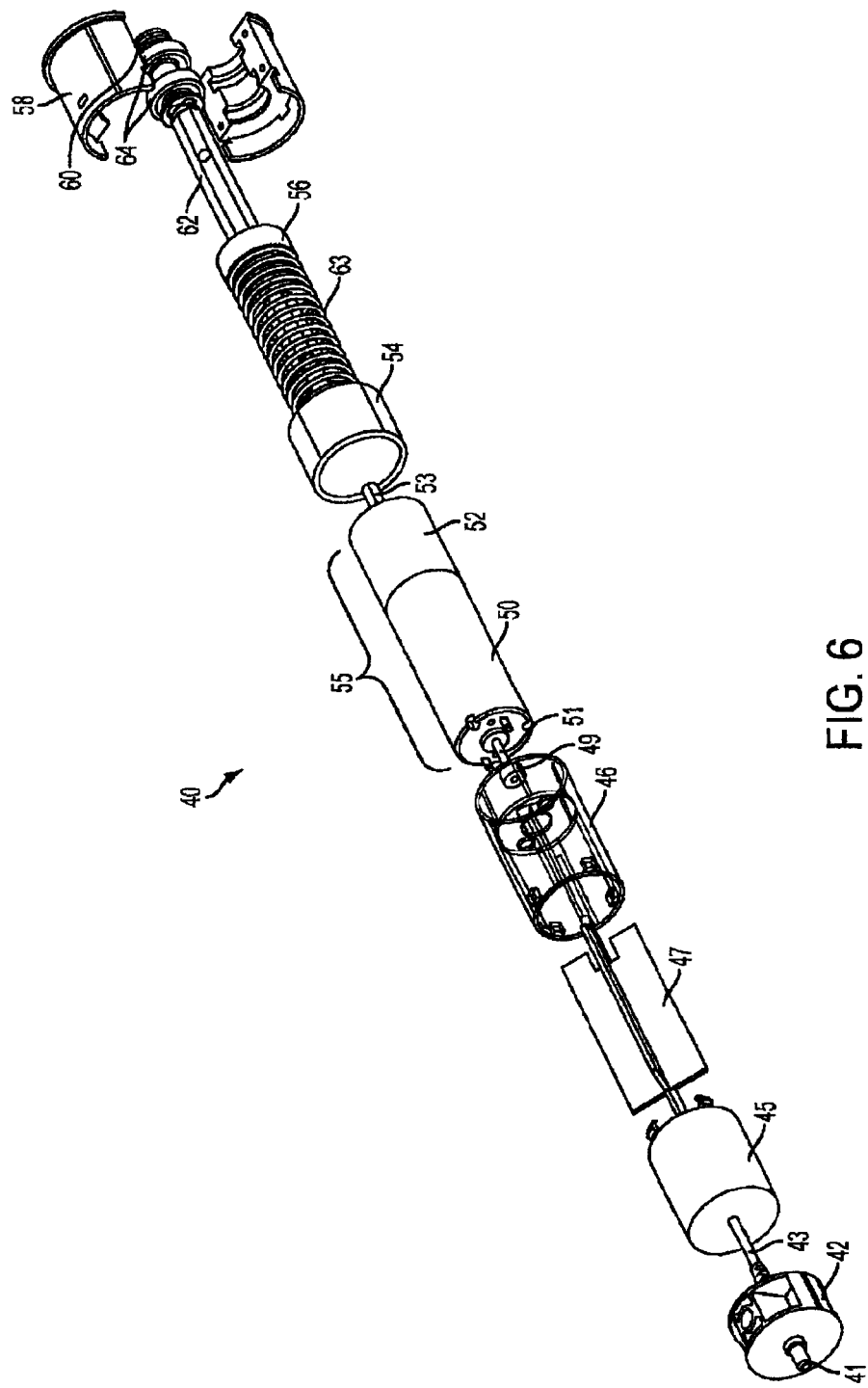
FIG. 6 depicts an exploded, isometric view of the motor/controller unit depicted in FIG. 5.

FIG. 6 depicts an exploded, isometric view of the motor/controller unit 40 depicted in FIG. 5. Generally, the motor/controller unit 40 includes an electrical power connector 42, a circuit board housing 44, a DC gear motor 55 that includes a DC motor 50 and an integral motor gear reducing assembly 52, a mount 54 for the DC gear motor 55, and a bearing housing 58.

The electrical power connector 42 includes a terminal 41 that couples to the power supply unit 80, and power cables 43 that connect to the circuit board(s) located within the circuit board housing 44. Terminal 41 includes positive and negative connectors that mate with cooperating positive and negative connectors of power supply unit 80, such as, for example, plug connectors, blade connectors, a coaxial connector, etc. In a preferred embodiment, the positive and negative connectors do not have a preferred orientation. The electrical power connector 42 is mechanically coupled to the inner surface of the shade tube 32 using a press fit, an interference fit, a friction fit, a key, adhesive, etc.

The circuit board housing 44 includes an end cap 45 and a housing body 46 within which at least one circuit board 47 is mounted. In the depicted embodiment, two circuit boards 47 are mounted within the circuit board housing 44 in an orthogonal relationship. Circuit boards 47 generally include all of the supporting circuitry and electronic components necessary to sense and control the operation of the motor 50, manage and/or condition the power provided by the power supply unit 80, etc., including, for example, a controller or microcontroller, memory, a wireless receiver, etc. In one embodiment, the microcontroller is an Microchip 8-bit microcontroller, such as the PIC18F25K20, while the wireless receiver is a Micrel QwikRadio® receiver, such as the MICRF219. The microcontroller may be coupled to the wireless receiver using a local processor bus, a serial bus, a serial peripheral interface, etc. In another embodiment, the wireless receiver and microcontroller may be integrated into a single chip, such as, for example, the Zensys ZW0201 Z-Wave Single Chip, etc.

The antenna for the wireless receiver may mounted to the circuit board or located, generally, inside the circuit board housing 44. Alternatively, the antenna may be located outside the circuit board housing 44, including, for example, the outer surface of the circuit board housing 44, the inner surface of the shade tube 32, the outer surface of the shade tube 32, the bearing housing 58, etc. The circuit board housing 44 may be mechanically coupled to the inner surface of the shade tube 32 using, for example, a press fit, an interference fit, a friction fit, a key, adhesive, etc. In one arrangement, the antenna is a fractal antenna or the like positioned on or in a printed circuit board or other mounting structure and positioned adjacent one of the open ends of the shade tube 32.

In another embodiment, a wireless transmitter is also provided, and information relating to the status, performance, etc., of the motorized roller shade 20 may be transmitted periodically to a wireless diagnostic device, or, preferably, in response to a specific query from the wireless diagnostic device. In one embodiment, the wireless transmitter is a Micrel QwikRadio® transmitter, such as the MICRF102. A wireless transceiver, in which the wireless transmitter and receiver are combined into a single component, may also be included, and in one embodiment, the wireless transceiver is a Micrel RadioWire® transceiver, such as the MICRF506. In another embodiment, the wireless transceiver and microcontroller may be integrated into a single module, such as, for example, the Zensys ZM3102 Z-Wave Module, etc. The functionality of the microcontroller, as it relates to the operation of the motorized roller shade 20, is discussed in more detail below.

In an alternative embodiment, the shade tube 32 includes one or more slots to facilitate the transmission of wireless signal energy to the wireless receiver, and from the wireless transmitter, if so equipped. For example, if the wireless signal is within the radio frequency (RF) band, the slot may be advantageously matched to the wavelength of the signal. For one RF embodiment, the slot is 1/8" wide and 2½" long; other dimensions are also contemplated.

The DC motor 50 is electrically connected to the circuit board 47, and has an output shaft that is connected to the input shaft of the motor gear reducing assembly 52. The DC motor 50 may also be mechanically coupled to the circuit board housing body 46 using, for example, a press fit, an interference fit, a friction fit, a key, adhesive, mechanical fasteners, etc. In various embodiments of the present invention, DC motor 50 and motor gear reducing assembly 52 are provided as a single mechanical package, such as the DC gear motors manufactured by Buhler Motor Inc.

In one preferred embodiment, DC gear motor 55 includes a 24V DC motor and a two-stage planetary gear system with a 40:1 ratio, such as, for example, Buhler DC Gear Motor 1.61.077.423, and is supplied with an average battery voltage of 9.6V.sub.avg provided by an eight D-cell battery stack. Other alternative embodiments are also contemplated by the present invention. However, this preferred embodiment offers particular advantages over many alternatives, including, for example, embodiments that include smaller average battery voltages, smaller battery sizes, 12V DC motors, three-stage planetary gear systems, etc.

For example, in this preferred embodiment, the 24V DC gear motor 55 draws a current of about 0.1 A when supplied with a battery voltage of 9.6V.sub.avg. However, under the same torsional loading and output speed (e.g., 30 rpm), a 12V DC gear motor with a similar gear system, such as, e.g., Baler DC Gear Motor 1.61.077.413, will draw a current of about 0.2 A when supplied with a battery voltage of 4.8V.sub.avg. Assuming similar motor efficiencies, the 24V DC gear motor supplied with 9.6V.sub.avg advantageously draws about 50% less current than the 12V DC gear motor supplied with 4.8V.sub.avg while producing the same power output.

In preferred embodiments of the present invention, the rated voltage of the DC gear motor is much greater than the voltage produced by the batteries, by a factor of two or more, for example, causing the DC motor to operate at a reduced speed and torque rating, which advantageously eliminates undesirable higher frequency noise and draws lower current from the batteries, thereby improving battery life. In other words, applying a lower-than-rated voltage to the DC gear motor causes the motor to run at a lower-than-rated speed to produce quieter operation and longer battery life as compared to a DC gear motor running at its rated voltage, which draws similar amperage while producing lower run cycle times to produce equivalent mechanical power. In the embodiment described above, the 24V DC gear motor, running at lower voltages, enhances the cycle life of the battery operated roller shade by about 20% when compared to a 12V DC gear motor using the same battery capacity. Alkaline, zinc and lead acid batteries may provide better performance than lithium or nickel batteries, for example.

In another example, four D-cell batteries produce an average battery voltage of about 4.8V.sub.avg, while eight D-cell batteries produce an average battery voltage of about 9.6V.sub.avg. Clearly, embodiments that include an eight D-cell battery stack advantageously provide twice as much battery capacity than those embodiments that include a four D-cell battery stack. Of course, smaller battery sizes, such as, e.g., C-cell, AA-cell, etc., offer less capacity than D-cells.

In a further example, supplying a 12V DC gear motor with 9.6V.sub.avg increases the motor operating speed, which requires a higher gear ratio in order to provide the same output speed as the 24V DC gear motor discussed above. In other words, assuming the same torsional loading, output speed (e.g., 30 rpm) and average battery voltage (9.6V.sub.avg), the motor operating speed of the 24V DC gear motor will be about 50% of the motor operating speed of the 12V DC gear motor. The higher gear ratio typically requires an additional planetary gear stage, which reduces motor efficiency, increases generated noise, reduces backdrive performance and may require a more complex motor controller. Consequently, those embodiments that include a 24V DC gear motor supplied with 9.6V.sub.avg offer higher efficiencies and less generated noise.

In one embodiment, the shaft 51 of DC motor 50 protrudes into the circuit board housing 44, and a multi-pole magnet 49 is attached to the end of the motor shaft 51. A magnetic encoder (not shown for clarity) is mounted on the circuit board 47 to sense the rotation of the multi-pole magnet 49, and outputs a pulse for each pole of the multi-pole magnet 49 that moves past the encoder. In a preferred embodiment, the multi-pole magnet 49 has eight poles and the gear reducing assembly 52 has a gear ratio of 30:1, so that the magnetic encoder outputs 240 pulses for each revolution of the shade tube 32. The controller advantageously counts these pulses to determine the operational and positional characteristics of the shade, curtain, etc. Other types of encoders may also be used, such as optical encoders, mechanical encoders, etc.

The number of pulses output by the encoder may be associated with a linear displacement of the shade 22 by a distance/pulse conversion factor or a pulse/distance conversion factor. In one embodiment, this conversion factor is constant regardless of the position of shade 22. For example, using the outer diameter d of the shade tube 32, e.g., 15/8 inches (1.625 inches), each rotation of the shade tube 32 moves the shade 22 a linear distance of .pi.*d, or about 5 inches. For the eight-pole magnet 49 and 30:1 gear reducing assembly 52 embodiment discussed above, the distance/pulse conversion factor is about 0.02 inches/pulse, while the pulse/distance conversion factor is about 48 pulses/inch. In another example, the outer diameter of the fully-wrapped shade 22 may be used in the calculation. When a length of shade 22 is wrapped on shade tube 32, such as 8 feet, the outer diameter of the wrapped shade 22 depends upon the thickness of the shade material. In certain embodiments, the outer diameter of the wrapped shade 22 may be as small as 1.8 inches or as large as 2.5 inches.

For the latter case, the distance/pulse conversion factor is about 0.03 inches/pulse, while the pulse/distance conversion factor is about 30 pulses/inch. Of course, any diameter between these two extremes, i.e., the outer diameter of the shade tube 32 and the outer diameter of the wrapped shade 22, may be used. These approximations generate an error between the calculated linear displacement of the shade and the true linear displacement of the shade, so an average or intermediate diameter may preferably reduce the error. In another embodiment, the conversion factor may be a function of the position of the shade 22, so that the conversion factor depends upon the calculated linear displacement of the shade 22.

In various preferred embodiments discussed below, the position of the shade 22 is determined and controlled based on the number of pulses that have been detected from a known position of shade 22. While the open position is preferred, the closed position may also be used as the known position. In order to determine the full range of motion of shade 22, for example, the shade may be electrically moved to the open position, an accumulated pulse counter may be reset and the shade 22 may then be moved to the closed position, manually and/or electrically. The total number of accumulated pulses represents the limit of travel for the shade, and any desirable intermediate positions may be calculated based on this number.

For example, an 8 foot shade that moves from the open position to the closed position may generate 3840 pulses, and various intermediate positions of the shade 22 can be advantageously determined, such as, 25% open, 50% open, 75% open, etc. Quite simply, the number of pulses between the open position and the 75% open position would be 960, the number of pulses between the open position and the 50% open position would be 1920, and so on. Controlled movement between these predetermined positions is based on the accumulated pulse count. For example, at the 50% open position, this 8 foot shade would have an accumulated pulse count of 1920, and controlled movement to the 75% open position would require an increase in the accumulated pulse count to 2880. Accordingly, movement of the shade 22 is determined and controlled based on accumulating the number of pulses detected since the shade 22 was deployed in the known position. An average number of pulses/inch may be calculated based on the total number of pulses and the length of shade 22, and an approximate linear displacement of the shade 22 can be calculated based on the number of pulses accumulated over a given time period. In this example, the average number of pulses/inch is 40, so movement of the shade 22 about 2 inches would generate about 80 pulses. Positional errors are advantageously eliminated by resetting the accumulated pulse counter to zero whenever the shade 22 is moved to the known position.

A mount 54 supports the DC gear motor 55, and may be mechanically coupled to the inner surface of the shade tube 32. In one embodiment, the outer surface of the mount 54 and the inner surface of the shade tube 32 are smooth, and the mechanical coupling is a press fit, an interference fit, a friction fit, etc. In another embodiment, the outer surface of the mount 54 includes several raised longitudinal protrusions that mate with cooperating longitudinal recesses in the inner surface of the shade tube 32. In this embodiment, the mechanical coupling is keyed; a combination of these methods is also contemplated. If the frictional resistance is small enough, the motor/controller unit 40 may be removed from the shade tube 32 for inspection or repair; in other embodiments, the motor/controller unit 40 may be permanently secured within the shade tube 32 using adhesives, etc.

As described above, the circuit board housing 44 and the mount 54 may be mechanically coupled to the inner surface of the shade tube 32. Accordingly, at least three different embodiments are contemplated by the present invention. In one embodiment, the circuit board housing 44 and the mount 54 are both mechanically coupled to the inner surface of the shade tube 32. In another embodiment, only the circuit board housing 44 is mechanically coupled to the inner surface of the shade tube 32. In a further embodiment, only the mount 54 is mechanically coupled to the inner surface of the shade tube 32.

The output shaft of the DC gear motor 55 is fixed to the support shaft 60, either directly (not shown for clarity) or through an intermediate shaft 62. When the motorized roller shade 20 is installed, support shaft 60 is attached to a mounting bracket that prevents the support shaft 60 from rotating. Because (a) the output shaft of the DC gear motor 55 is coupled to the support shaft 60 which is fixed to the mounting bracket, and (b) the DC gear motor 55 is mechanically-coupled to the shade tube, operation of the DC gear motor 55 causes the DC gear motor 55 to rotate about the fixed output shaft, which causes the shade tube 32 to rotate about the fixed output shaft as well.

Bearing housing 58 includes one or more bearings 64 that are rotatably coupled to the support shaft 60. In a preferred embodiment, bearing housing 58 includes two rolling element bearings, such as, for example, spherical ball bearings; each outer race is attached to the bearing housing 58, while each inner race is attached to the support shaft 60. In a preferred embodiment, two ball bearings are spaced about ⅜" apart giving a total support land of about 0.8" or 20 mm; in an alternative embodiment, the intra-bearing spacing is about twice the diameter of support shaft 60. Other types of low-friction bearings are also contemplated by the present invention.

The motor/controller unit 40 may also include counterbalancing. In a preferred embodiment, motor/controller unit 40 includes a fixed perch 56 attached to intermediate shaft 62. In this embodiment, mount 54 functions as a rotating perch, and a counterbalance spring 63 (not shown in FIG. 5 for clarity; shown in FIG. 6) is attached to the rotating perch 54 and the fixed perch 56. The intermediate shaft 62 may be hexagonal in shape to facilitate mounting of the fixed perch 56. Preloading the counterbalance spring advantageously improves the performance of the motorized roller shade 20.

Figure 7A:
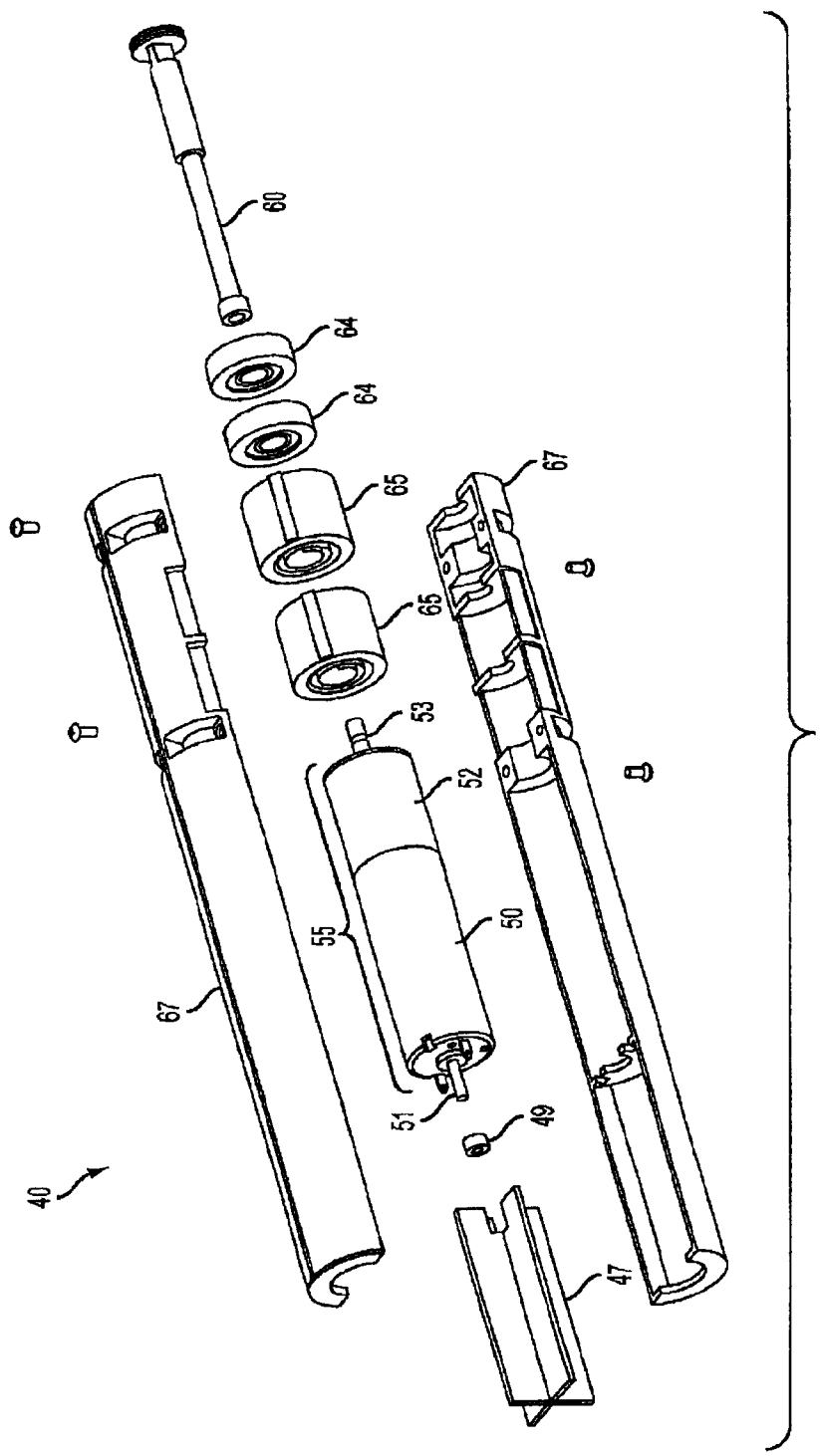
FIGS. 7A and 7B depict exploded, isometric views of a motor/controller unit according to an alternative embodiment of the present invention.
Figure 7B:
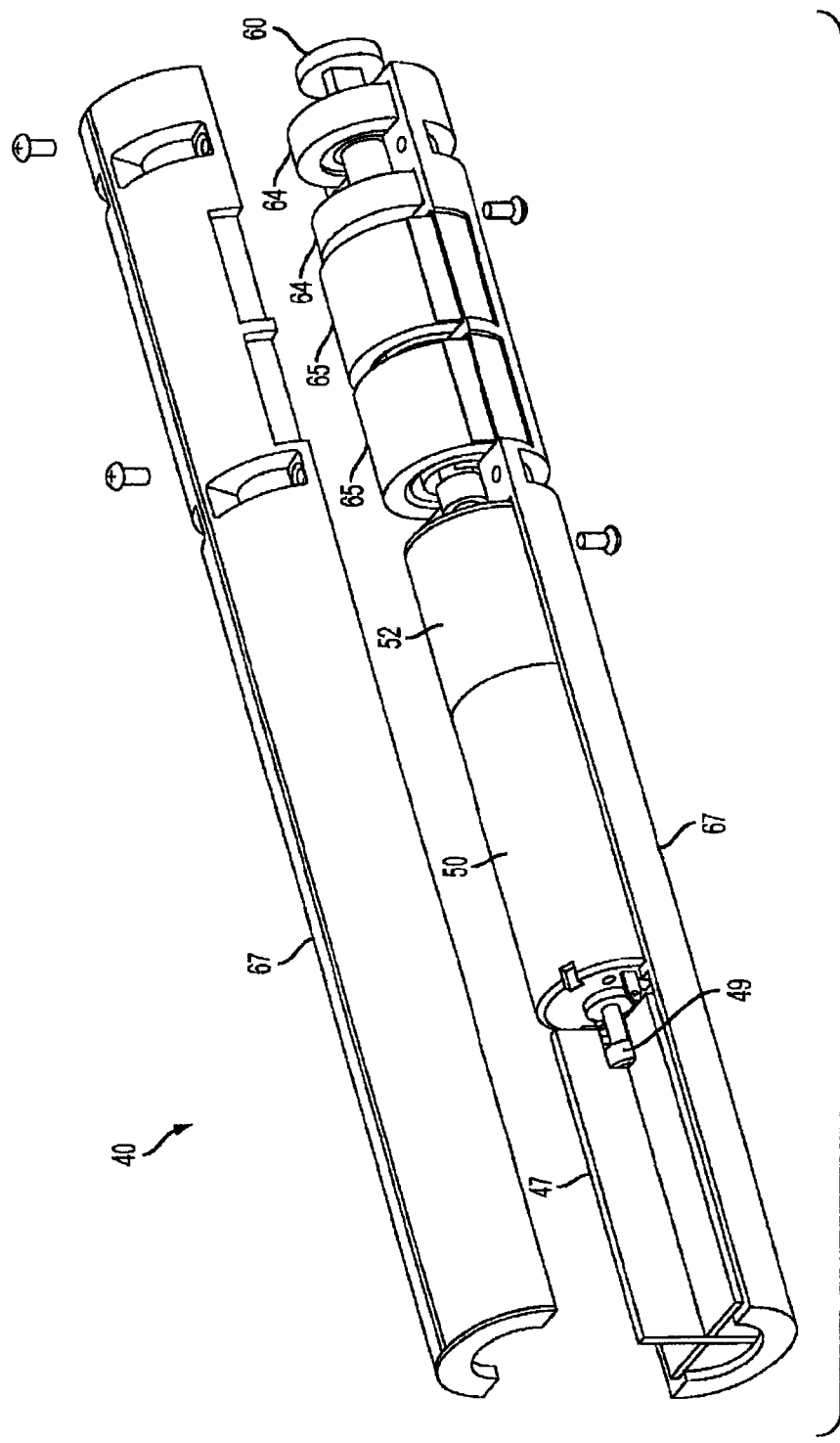

FIGS. 7A and 7B depict exploded, isometric views of a motor/controller unit 40 according to an alternative embodiment of the present invention. In this embodiment, housing 67 contains the major components of the motor/controller unit 40, including DC gear motor 55 (e.g., DC motor 50 and motor gear reducing assembly 52), one or more circuit boards 47 with the supporting circuitry and electronic components described above, and at least one bearing 64. The output shaft 53 of the DC gear motor 55 is fixedly-attached to the support shaft 60, while the inner race of bearing 64 is rotatably-attached support shaft 60. In one counterbalance embodiment, at least one power spring 65 is disposed within housing 67, and is rotatably-attached to support shaft 60. Housing 67 may be formed from two complementary sections, fixed or removably joined by one or more screws, rivets, etc.

Figure 7C:
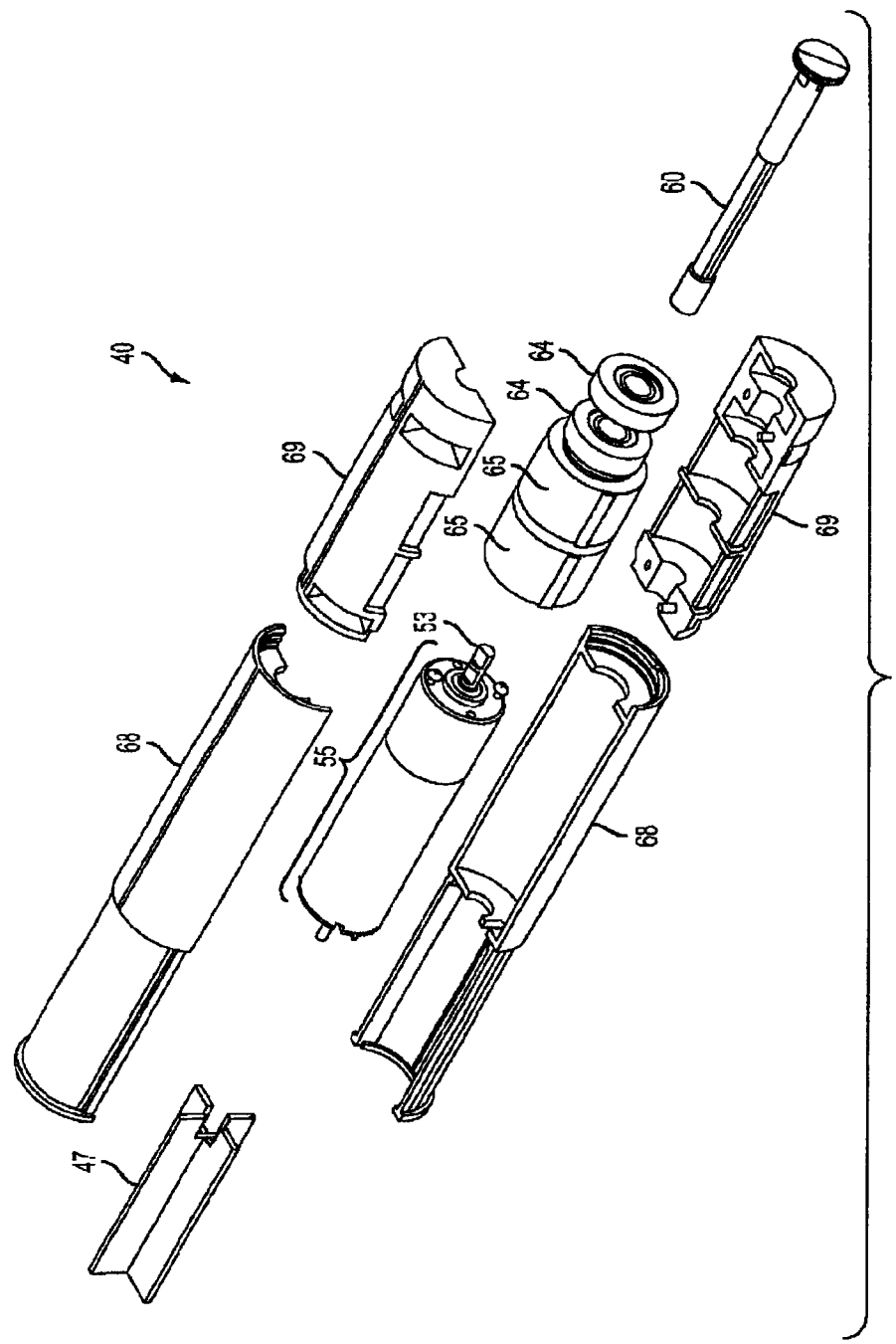

FIGS. 7C, 7D and 7E depict isometric views of a motor/controller unit 40 according to another alternative embodiment of the present invention. In this embodiment, housing 68 contains the DC gear motor 55 (e.g., DC motor 50 and motor gear reducing assembly 52), one or more circuit boards 47 with the supporting circuitry and electronic components described above, while housing 69 includes at least one bearing 64. Housings 68 and 69 may be attachable to one another, either removably or permanently. The output shaft 53 of the DC gear motor 55 is fixedly-attached to the support shaft 60, while the inner race of bearing 64 is rotatably-attached support shaft 60. In one counterbalance embodiment, at least one power spring 65 is disposed within housing 69, and is rotatably-attached to support shaft 60. While the depicted embodiment includes two power springs 65, three (or more) power springs 65 may be used, depending on the counterbalance force required, the available space within shade tube 32, etc. Housings 68 and 69 may be formed from two complementary sections, fixed or removably joined by one or more screws, rivets, etc.

Figure 8A:
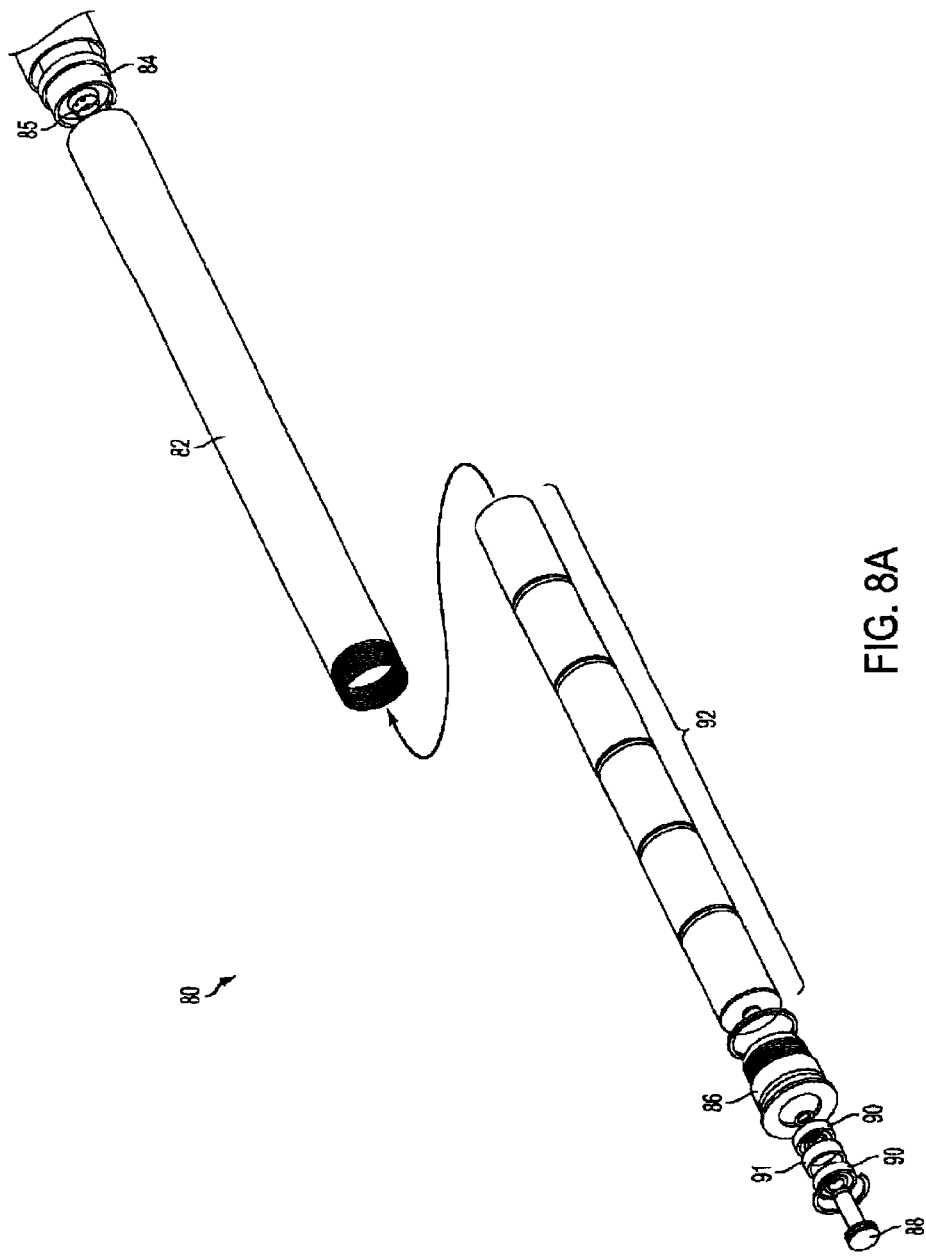
FIG. 8A depicts an exploded, isometric view of the power supply unit depicted in FIGS. 4 and 5.

FIG. 8A depicts an exploded, isometric view of the power supply unit 80 depicted in FIGS. 4 and 5. Generally, the power supply unit 80 includes a battery tube 82, an outer end cap 86, and a inner end cap 84. The outer end cap 86 includes one or more bearings 90 that are rotatably coupled to a support shaft 88. In a preferred embodiment, outer end cap 86 includes two low-friction rolling element bearings, such as, for example, spherical ball bearings, separated by a spacer 91; each outer race is attached to the outer end cap 86, while each inner race is attached to the support shaft 88. Other types of low-friction bearings are also contemplated by the present invention. In one alternative embodiment, bearings 86 are simply bearing surfaces, preferably low-friction bearing surfaces, while in another alternative embodiment, support shaft 88 is fixedly attached to the outer end cap 86, and the external shade support bracket provides the bearing surface for the support shaft 88.

In the depicted embodiment, the outer end cap 86 is removable and the inner cap 84 is fixed. In other embodiments, the inner end cap 84 may be removable and the outer end cap 86 may be fixed, both end caps may be removable, etc. The removable end cap(s) may be threaded, slotted, etc.

The outer end cap 86 also includes a positive terminal that is coupled to the battery tube 82. The inner end cap 84 includes a positive terminal coupled to the battery tube 82, and a negative terminal coupled to a conduction spring 85. When a battery stack 92, including at least one battery, is installed in the battery tube 82, the positive terminal of the outer end cap 86 is electrically coupled to the positive terminal of one of the batteries in the battery stack 92, and the negative terminal of the inner end cap 84 is electrically coupled to the negative terminal of another one of the batteries in the battery stack 92. Of course, the positive and negative terminals may be reversed, so that the conduction spring 85 contacts the positive terminal of one of the batteries in the battery stack 92, etc.

The outer end cap 86 and the inner end cap 84 are mechanically coupled to the inner surface of the shade tube 32. In one embodiment, the outer surface of the mount 84 and the inner surface of the shade tube 32 are smooth, and the mechanical coupling is a press fit, an interference fit, a friction fit, etc. In another embodiment, the outer surface of the mount 84 includes several raised longitudinal protrusions that mate with cooperating longitudinal recesses in the inner surface of the shade tube 32. In this embodiment, the mechanical coupling is keyed; a combination of these methods is also contemplated. Importantly, the frictional resistance should be small enough such that the power supply unit 80 can be removed from the shade tube 32 for inspection, repair and battery replacement.

In a preferred embodiment, the battery stack 92 includes eight D-cell batteries connected in series to produce an average battery stack voltage of 9.6V.sub.avg. Other battery sizes, as well as other DC power sources disposable within battery tube 82, are also contemplated by the present invention.

After the motor/controller unit 40 and power supply unit 80 are built up as subassemblies, final assembly of the motorized roller shade 20 is quite simple. The electrical connector 42 is fitted within the inner cavity of shade tube 32 to a predetermined location; power cables 43 has a length sufficient to permit the remaining sections of the motor/controller unit 40 to remain outside the shade tube 32 until the electrical connector 42 is properly seated. The remaining sections of the motor/controller unit 40 are then fitted within the inner cavity of shade tube 32, such that the bearing housing 58 is approximately flush with the end of the shade tube 32. The power supply unit 80 is then inserted into the opposite end until the positive and negative terminals of the inner end cap 84 engage the terminal 41 of the electrical connector 42. The outer end cap 86 should be approximately flush with end of the shade tube 32.

Figure 8B:
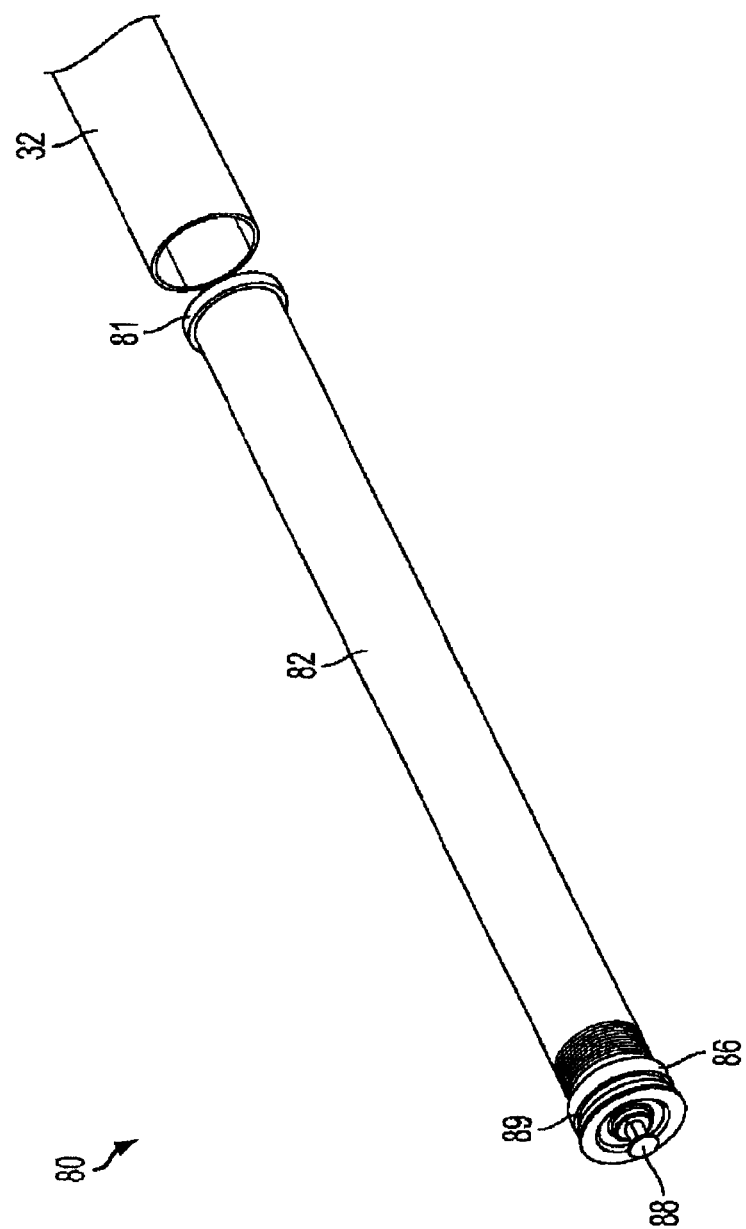
FIGS. 8B and 8C depict an exploded, isometric view of a power supply unit according to an alternative embodiment of the present invention.

In the alternative embodiment depicted in FIG. 8B, the outer end cap 86 is mechanically coupled to the inner surface of the shade tube 32 using a press fit, interference fit, an interference member, such as O-ring 89, etc., while the inner end cap 81 is not mechanically coupled to the inner surface of the shade tube 32.

Figure 8C:
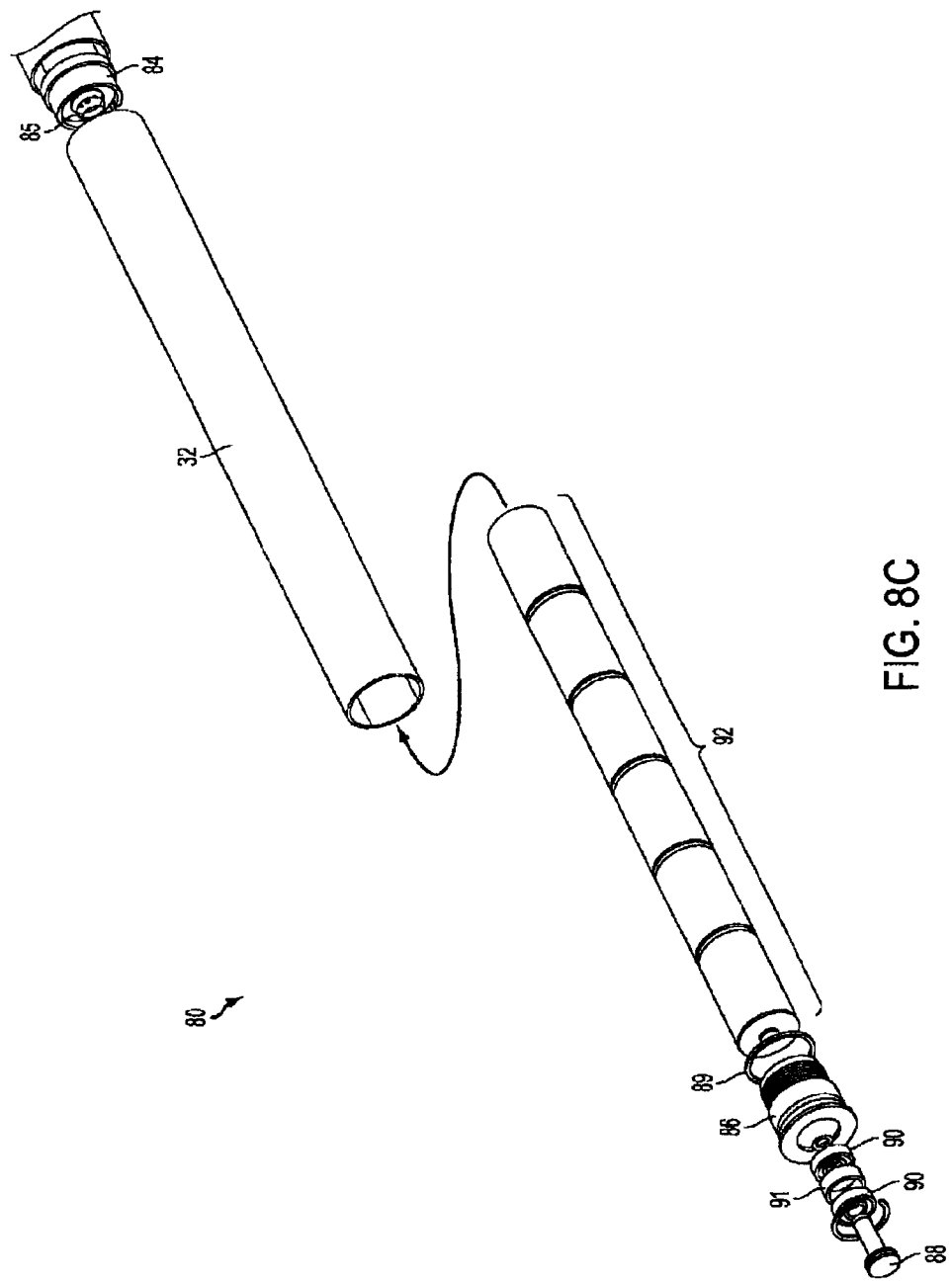

In the alternative embodiment depicted in FIG. 8C, the shade tube 32 functions as the battery tube 82, and the battery stack 92 is simply inserted directly into shade tube 32 until one end of the battery stack 92 abuts the inner end cap 84. The positive terminal of the outer end cap 86 is coupled to the positive terminal of the inner end cap 84 using a wire, foil strip, trace, etc. Of course, the positive and negative terminals may be reversed, so that the respective negative terminals are coupled.

In a further alternative embodiment, the batteries may be mounted outside of the shade tube, and power may be provided to the components located within the shade tube using commutator or slip rings, induction techniques, and the like. Additionally, the external batteries may be replaced by any external source of DC power, such as, for example, an AC/DC power converter, a solar cell, etc.

FIGS. 9A and 9B depict exploded, isometric views of a power supply unit according to an alternative embodiment of the present invention. In this embodiment, power supply unit 80 includes a housing 95 with one or more bearings 90 that are rotatably coupled to a support shaft 88, a power coupling 93 to receive power from an external power source, and positive and negative terminals to engage the electrical connector 42. Power cables 97 (shown in phantom for clarity) extend from the power coupling 93, through a hollow central portion of support shaft 88, to an external DC power source. In a preferred embodiment, housing 95 includes two low-function rolling element bearings 90, such as, for example, spherical ball bearings: each outer race is attached to the housing 95, while each inner race is attached to the support shaft 88. Other types of low-friction bearings are also contemplated by the present invention. Housing 95 may be formed from two complementary sections, fixed or removably joined by one or more screws, rivets, etc.

In one embodiment, the support shafts 88 are slidingly-attached to the inner race of ball bearings 90 so that the support shafts 88 may be displaced along the rotational axis of the shade tube 32. This adjustability advantageously allows an installer to precisely attach the end of the support shafts 88 to the respective mounting bracket by adjusting the length of the exposed portion of the support shafts 88. In a preferred embodiment, outer end cap 86 and housing 95 may provide approximately 0.5" of longitudinal movement for the support shafts 88. Additionally, mounting brackets 5, 7, 15 and 17 are embossed so that the protruding portion of the mounting bracket will only contact the inner race of bearings 64 and 90 and will not rub against the edge of the shade or the shade tube 32 if the motorized roller shade 20 is installed incorrectly. In a preferred embodiment, the bearings may accommodate up to 0.125" of misalignment due to installation errors without a significant reduction in battery life.

In an alternative embodiment, the microcontroller receives control signals from a wired remote control. These control signals may be provided to the microcontroller in various ways, including, for example, over power cables 97, over additional signal lines that are accommodated by power coupling 93, over additional signal lines that are accommodated by a control signal coupling (not shown in FIGS. 9A,B for clarity), etc.

Figure 10:
FIG. 10 presents a front view of a motorized roller shade, according to an embodiment of the present invention.
Figure 11:
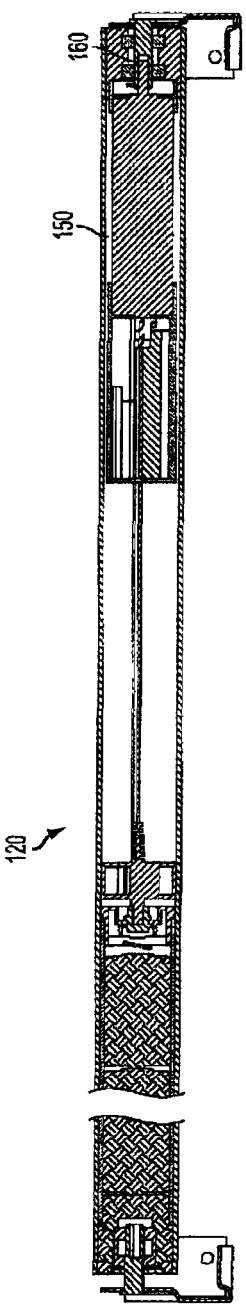
FIG. 11 presents a sectional view along the longitudinal axis of the motorized roller shade depicted in FIG. 10.
Figure 14:
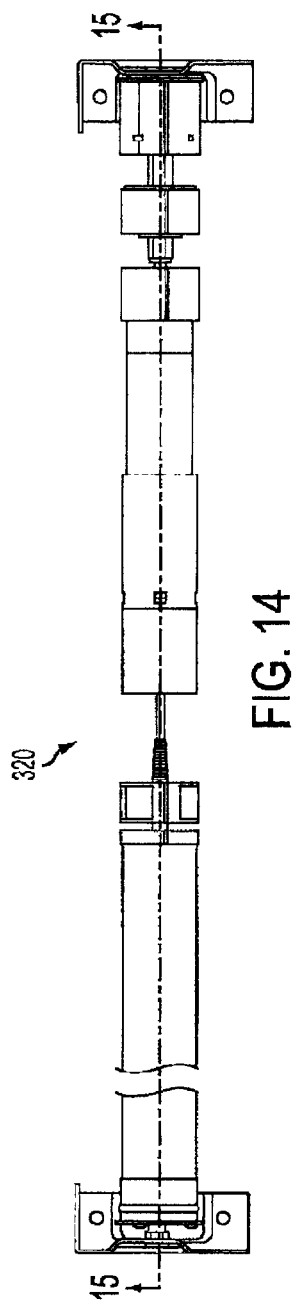
FIG. 14 presents a front view of a motorized roller shade, according to an embodiment of the present invention.
Figure 15:
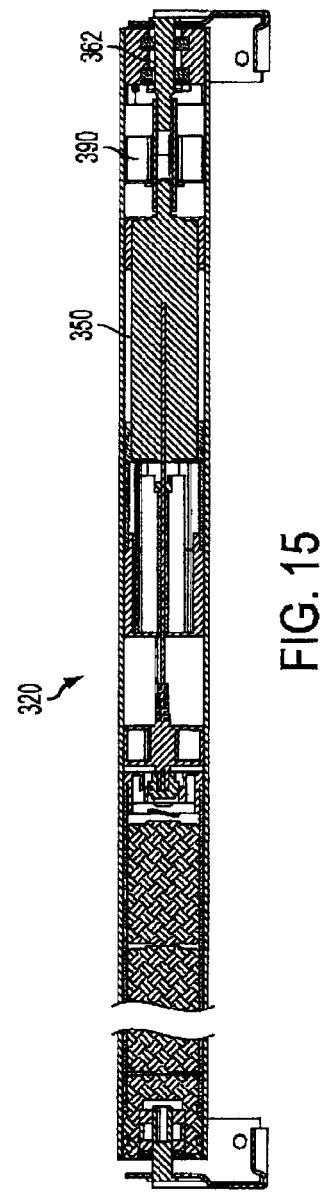
FIG. 15 presents a sectional view along the longitudinal axis of the motorized roller shade depicted in FIG. 14.
Figure 16:
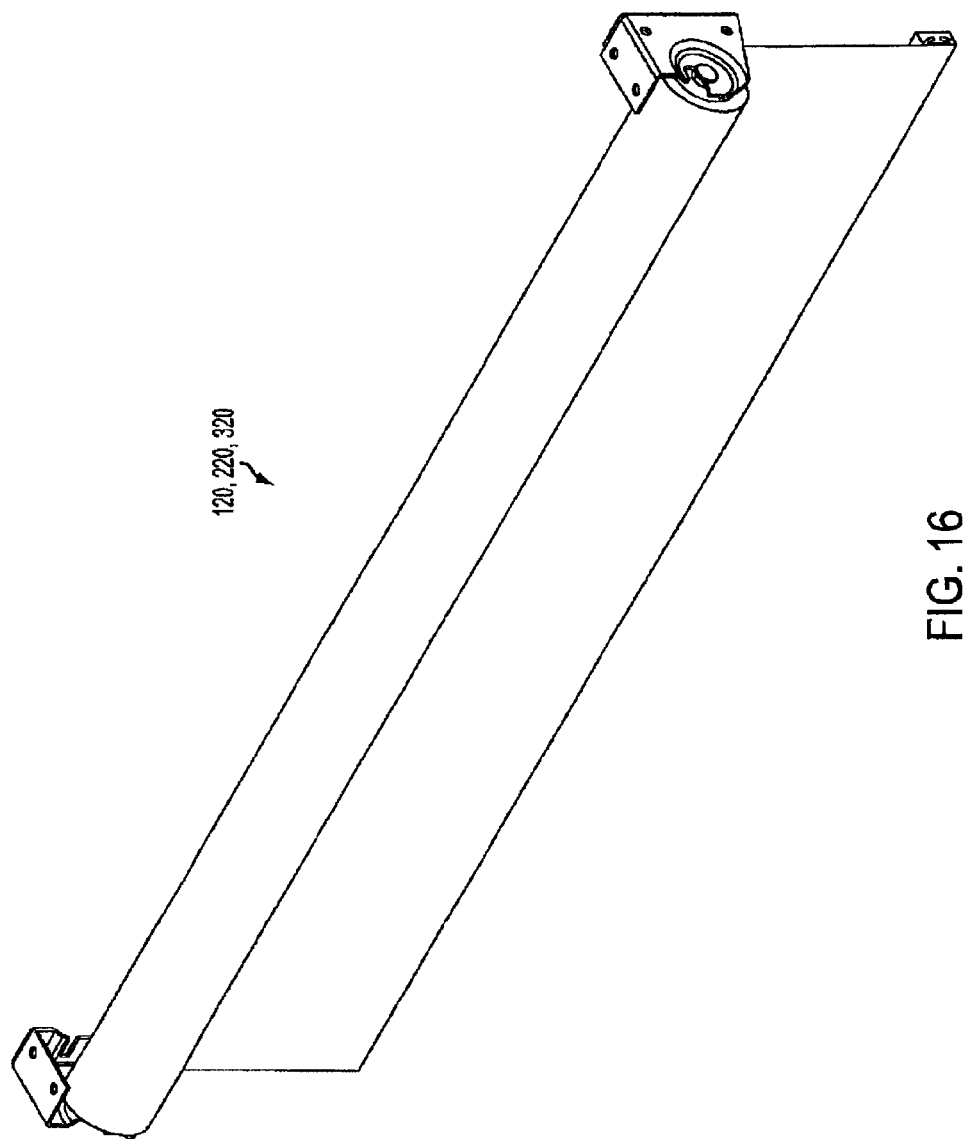
FIG. 16 presents an isometric view of a motorized roller shade assembly in accordance with the embodiments depicted in FIGS. 10-15.

Various additional embodiments of the present invention are presented in FIGS. 10-16. FIGS. 10 and 11 depict an alternative embodiment of the present invention without counterbalancing; FIG. 10 presents a front view of a motorized roller shade 120, while FIG. 11 presents a sectional view along the longitudinal axis of the motorized roller shade 120. In this embodiment, the output shaft of the DC gear motor 150 is attached to the support shaft 160, and an intermediate shaft is not included. FIGS. 12 and 13 depict an alternative embodiment of the present invention with counterbalancing; FIG. 12 presents a front view of a motorized roller shade 220, while FIG. 13 presents a sectional view along the longitudinal axis of the motorized roller shade 220. In this embodiment, the output shaft of the DC gear motor 250 is attached to the intermediate shaft 262, and a counterbalance spring (not shown for clarity) couples rotating perch 254 to fixed perch 256. FIGS. 14 and 15 depict an alternative embodiment of the present invention with counterbalancing; FIG. 14 presents a front view of a motorized roller shade 320, while FIG. 15 presents a sectional view along the longitudinal axis of the motorized roller shade 320. In this embodiment, the output shaft of the DC gear motor 350 is attached to the intermediate shaft 362. A power spring 390 couples the intermediate shaft 362 to the inner surface of the shade tube 332. FIG. 16 presents an isometric view of a motorized roller shade assemblies 120, 220, 320 in accordance with the embodiments depicted in FIGS. 10-15.

Motorized roller shade 20 may be controlled manually and/or remotely using a wireless or wired remote control. Generally, the microcontroller executes instructions stored in memory that sense and control the motion of DC gear motor 55, decode and execute commands received from the remote control, monitor the power supply voltage, etc. More than one remote control may be used with a single motorized roller shade 20, and a single remote control may be used with more than one motorized roller shade 20.

Figure 17:
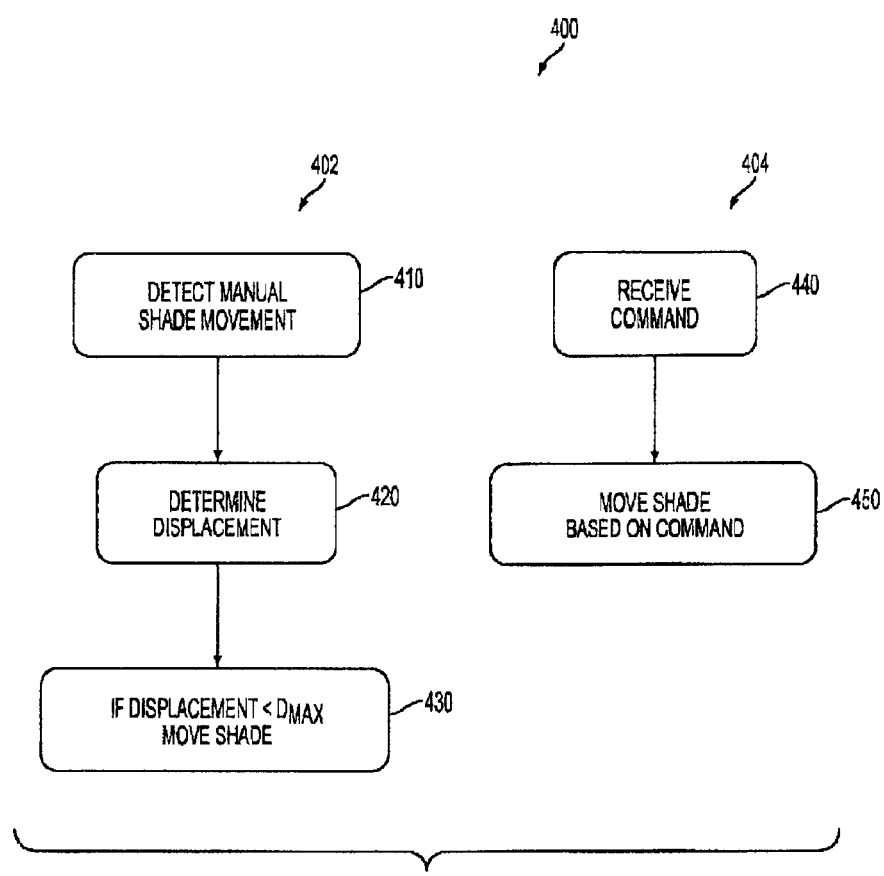
FIG. 17 presents a method 400 for controlling a motorized roller shade 20, according to an embodiment of the present invention.

FIG. 17 presents a method 400 for controlling a motorized roller shade 20, according to an embodiment of the present invention. Generally, method 400 includes a manual control portion 402 and a remote control portion 404. In one embodiment, method 400 includes the manual control portion 402, in another embodiment, method 400 includes the remote control portion 404, and, in a preferred embodiment, method 400 includes both the manual control portion 402 and the remote control portion 404.

During the manual control portion 402 of method 400, a manual movement of the shade 22 is detected (410), a displacement associated with the manual movement is determined (420), and, if the displacement is less than a maximum displacement, the shade 22 is moved (430) to a different position by rotating the shade tube 32 using the DC gear motor 55.

In one embodiment, the microcontroller detects a manual downward movement of the shade 22 by monitoring a reed switch, while in an alternative embodiment, the microcontroller simply monitors the encoder. In a preferred embodiment, after the initial downward movement or tug is detected by the reed switch, the microcontroller begins to count the encoder pulses generated by the rotation of the shade tube 32 relative to the fixed motor shaft 51. When the encoder pulses cease, the downward movement has stopped, and the displacement of the shade 22 is determined and then compared to a maximum displacement. In one embodiment, the shade displacement is simply the total number of encoder pulses received by the microcontroller, and the maximum displacement is a predetermined number of encoder pulses. In another embodiment, the microcontroller converts the encoder pulses to a linear distance, and then compares the calculated linear distance to a maximum displacement, such as 2 inches.

In one example, the maximum number of encoder pulses is 80, which may represent approximately 2 inches of linear shade movement in certain embodiments. If the total number of encoder pulses received by the microcontroller is greater than or equal to 80, then the microcontroller does not energize the DC gear motor 55 and the shade 22 simply remains at the new position. On the other hand, if the total number of encoder pulses received by the microcontroller is less than 80, then the microcontroller moves the shade 22 to a different position by energizing the DC gear motor 55 to rotate the shade tube 32. After the microcontroller determines that the shade 22 has reached the different position, the DC gear motor 55 is de-energized.

In preferred embodiments, the microcontroller maintains the current position of the shade 22 by accumulating the number of encoder pulses since the shade 22 was deployed in the known position. As described above, the known (e.g., open) position has an accumulated pulse count of 0, and the various intermediate positions each have an associated accumulated pulse count, such as 960, 1920, etc. When the shade 22 moves in the downward direction, the microcontroller increments the accumulated pulse counter, and when the shade 22 moves in the upward direction, the microcontroller decrements the accumulated pulse counter. Each pulse received from the encoder increments or decrements the accumulated pulse counter by one count. Of course, the microcontroller may convert each pulse count to a linear distance, and perform these calculations in units of inches, millimeters, etc.

In a preferred embodiment, limited manual downward movement of the shade 22 causes the microcontroller to move the shade to a position located directly above the current position, such as 25% open, 50% open, 75% open, 100% open, etc. Each of these predetermined positions has an associated accumulated pulse count, and the microcontroller determines that the shade 22 has reached the different position by comparing the value in the accumulated pulse counter to the accumulated pulse count of the predetermined position; when the accumulated pulse counter equals the predetermined position accumulated pulse count, the shade 22 has reached the different position.

Other sets of predetermined positions are also contemplated by the present invention, such as 0% open, 50% open, 100% open; 0% open, 33% open, 66% open, 100% open; 0% open, 10% open, 20% open, 30% open, 40% open, 50% open, 60% open, 70% open, 80% open, 90% open, 100% open; etc. Advantageously, the accumulated pulse count associated with each position may be reprogrammed by the user to set one or more custom positions.

Manual upward movement of the shade 22 may be detected and measured using an encoder that senses direction as well as rotation, such as, for example, an incremental rotary encoder, a relative rotary encoder, a quadrature encoder, etc. In other embodiments, limited upward movement of the shade 22 causes the microcontroller to move the shade to a position located above the current position, etc.

During the remote control portion 404 of method 400, a command is received (440) from a remote control, and the shade 22 is moved (450) to a position associated with the command.

In preferred embodiments, the remote control is a wireless transmitter that has several shade position buttons that are associated with various commands to move the shade 22 to different positions. The buttons activate switches that may be electro-mechanical, such as, for example, momentary contact switches, etc, electrical, such as, for example, a touch pad, a touch screen, etc. Upon activation of one of these switches, the wireless transmitter sends a message to the motorized roller shade 20 that includes a transmitter identifier and a command associated with the activated button. In preferred embodiments, the remote control is pre-programmed such that each shade position button will command the shade to move to a predetermined position. Additionally, remote control functionality may be embodied within a computer program, and this program may be advantageously hosted on a wireless device, such as an iPhone. The wireless device may communicate directly with the motorized roller shade 20, or through an intermediate gateway, bridge, router, base station, etc.

In these preferred embodiments, the motorized roller shade 20 includes a wireless receiver that receives, decodes and sends the message to the microcontroller for further processing. The message may be stored within the wireless transmitter and then sent to the microcontroller immediately after decoding, or the message may be sent to the microcontroller periodically, e.g., upon request by the microcontroller, etc. One preferred wireless protocol is the Z-Wave Protocol, although other wireless communication protocols are contemplated by the present invention.

After the message has been received by the microcontroller, the microcontroller interprets the command and sends an appropriate control signal to the DC gear motor 55 to move the shade in accordance with the command. As discussed above, the DC gear motor 55 and shade tube 32 rotate together, which either extends or retracts the shade 22. Additionally, the message may be validated prior to moving the shade, and the command may be used during programming to set a predetermined deployment of the shade.

For example, if the accumulated pulse counter is 3840 and the shade 22 is 0% open, receiving a 50% open command will cause the microcontroller to energize the DC gear motor 55 to move the shade 22 upwards to this commanded position. As the shade 22 is moving, the microcontroller decrements the accumulated pulse counter by one count every time a pulse is received from the encoder, and when the accumulated pulse counter reaches 1920, the microcontroller de-energizes the DC gear motor 55, which stops the shade 22 at the 50% open position. In one embodiment, if a different command is received while the shade 22 is moving, the microcontroller may stop the movement of the shade 22. For example, if the shade 22 is moving in an upward direction and a close (0% open) command is received, the microcontroller may de-energize the DC gear motor 55 to stop the movement of the shade 22. Similarly, if the shade 22 is moving in a downward direction and a 100% open command is received, the microcontroller may de-energize the DC gear motor 55 to stop the movement of the shade 22. Other permutations are also contemplated by the present invention, such as moving the shade 22 to the predetermined position associated with the second command, etc.

In a preferred embodiment, a command to move the shade to the 100% open position resets the accumulated pulse counter to 0, and the microcontroller de-energizes the DC gear motor 55 when the encoder pulses cease. Importantly, an end-of-travel stop, such as bottom bar 28, stops 24 and 26, and the like, engage corresponding structure on the mounting brackets when the shade 22 has been retracted to the 100% open position. This physical engagement stops the rotation of the shade tube 32 and stalls the DC gear motor 55. The microcontroller senses that the encoder has stopped sending pulses, e.g., for one second, and de-energizes the DC gear motor 55. When the shade 22 is moving in the other direction, the microcontroller may check an end-of-travel pulse count in order to prevent the shade 22 from extending past a preset limit.

In other embodiments, the movement of the shade 22 may simply be determined using relative pulse counts. For example, if the current position of the shade 22 is 100% open, and a command to move the shade 22 to the 50% open position is received, the microcontroller may simply energize the DC gear motor 55 until a certain number of pulses have been received, by the microcontroller, from the encoder. In other words, the pulse count associated with predetermined position is relative to the predetermined position located directly above or below, rather than the known position.

Figure 18:
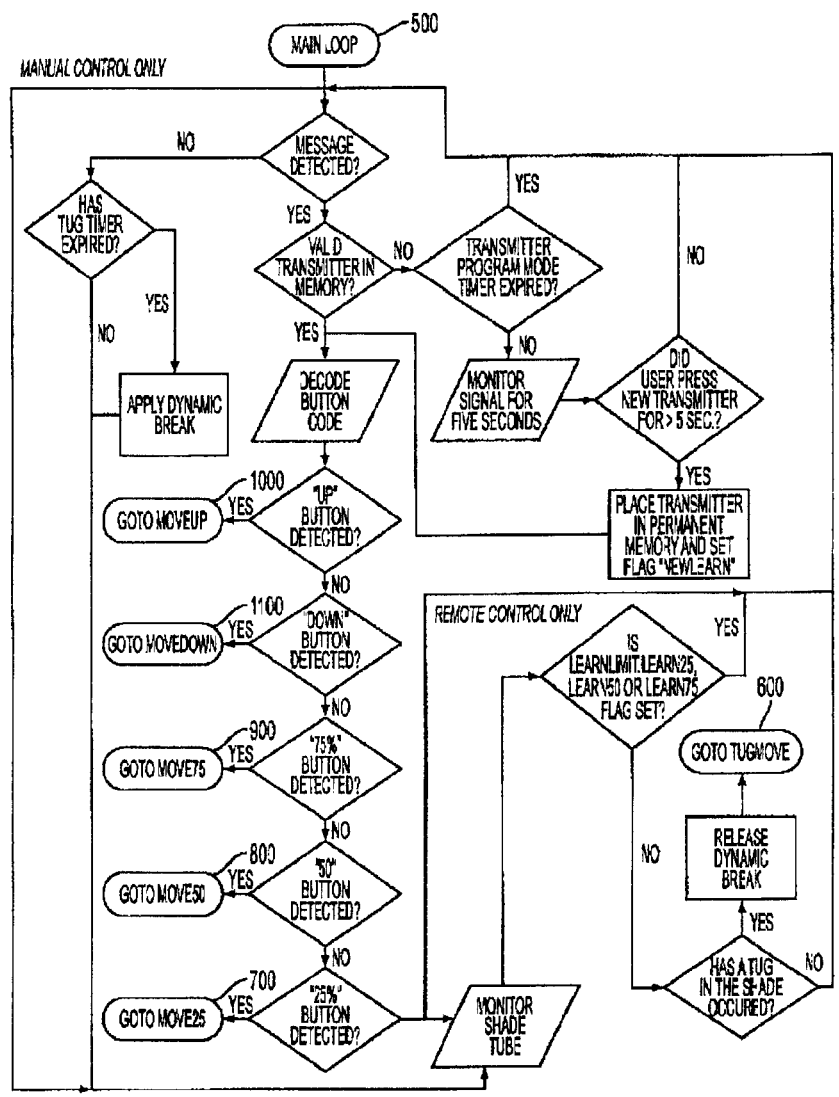
FIGS. 18 to 25 present operational flow charts illustrating various preferred embodiments of the present invention.
Figure 19:
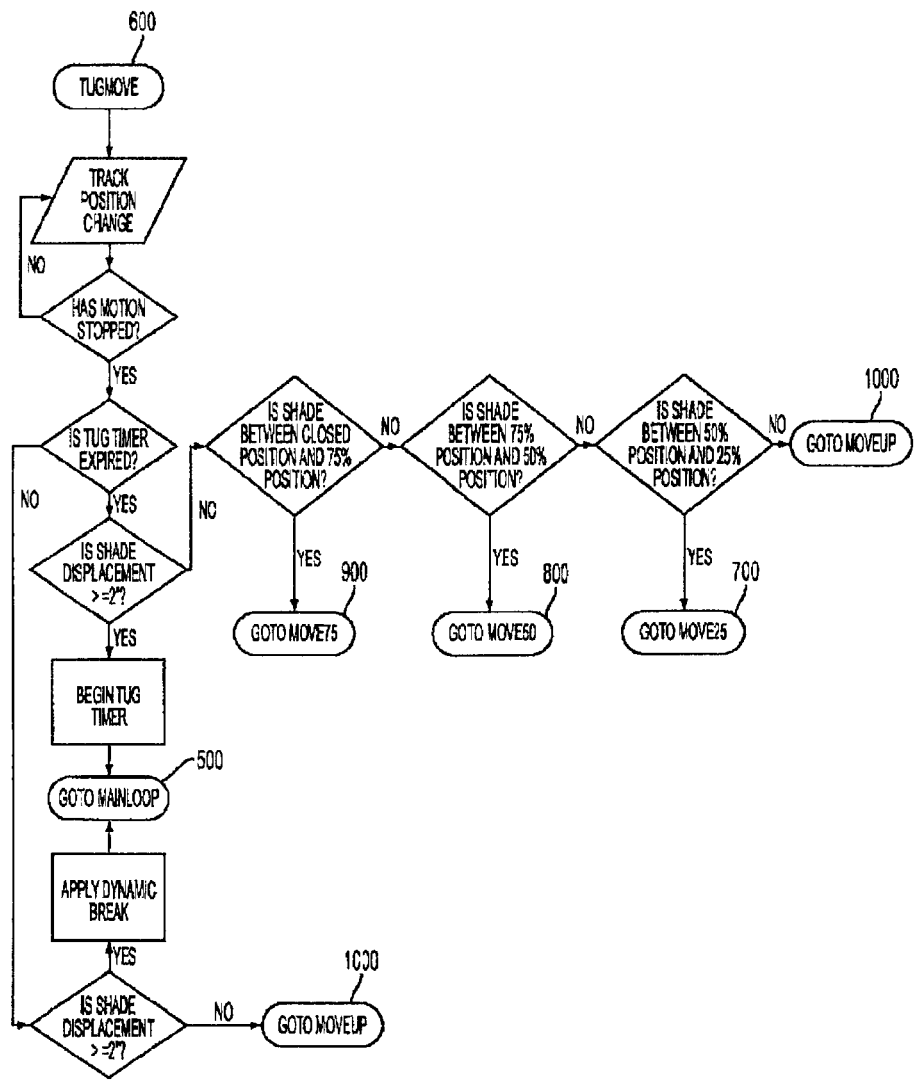
Figure 20:
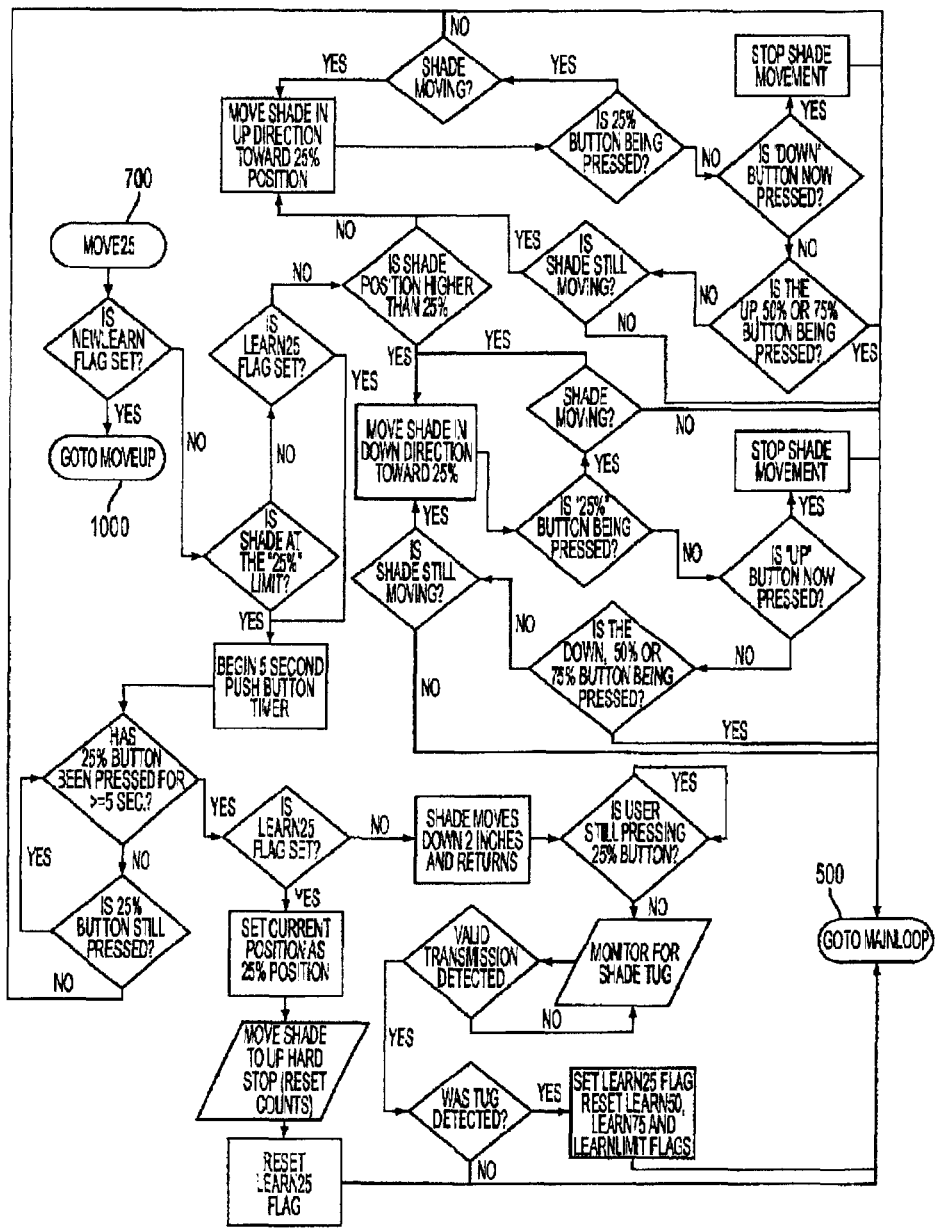
Figure 21:
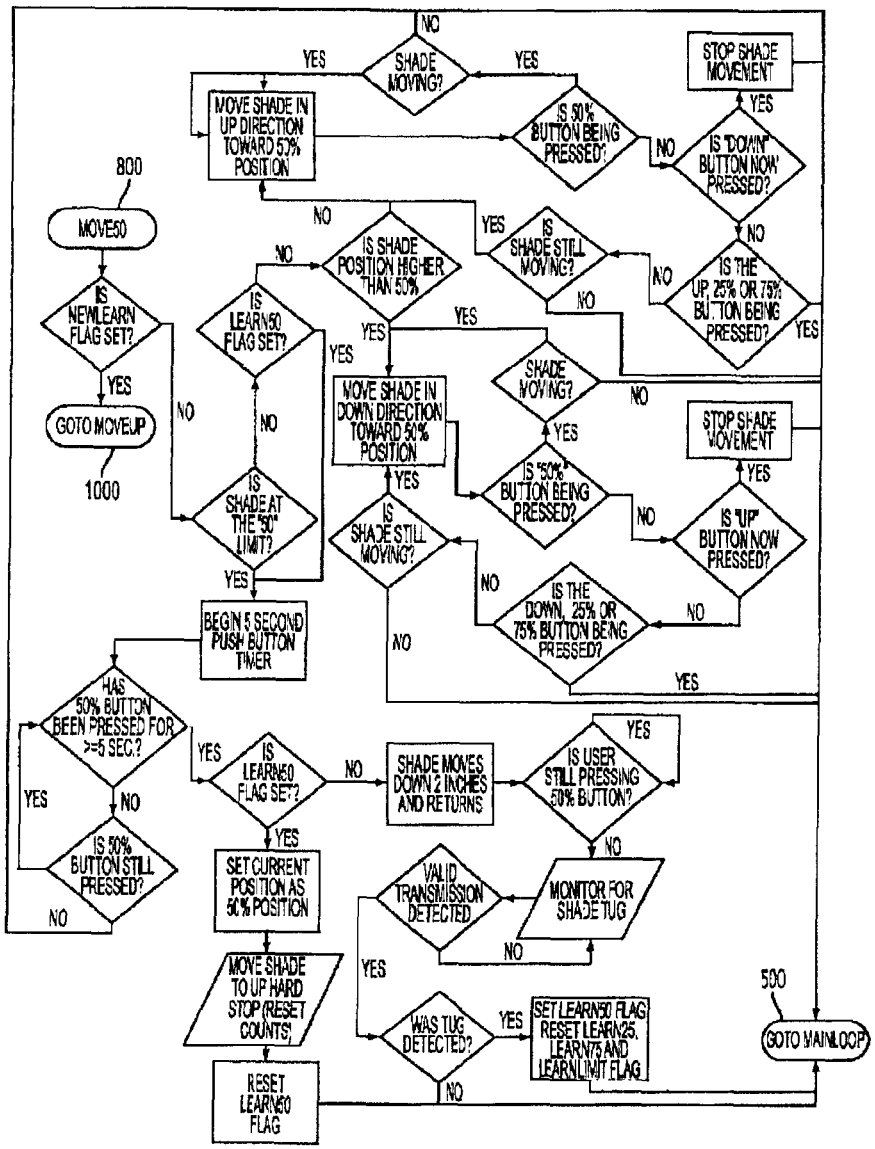
Figure 22:
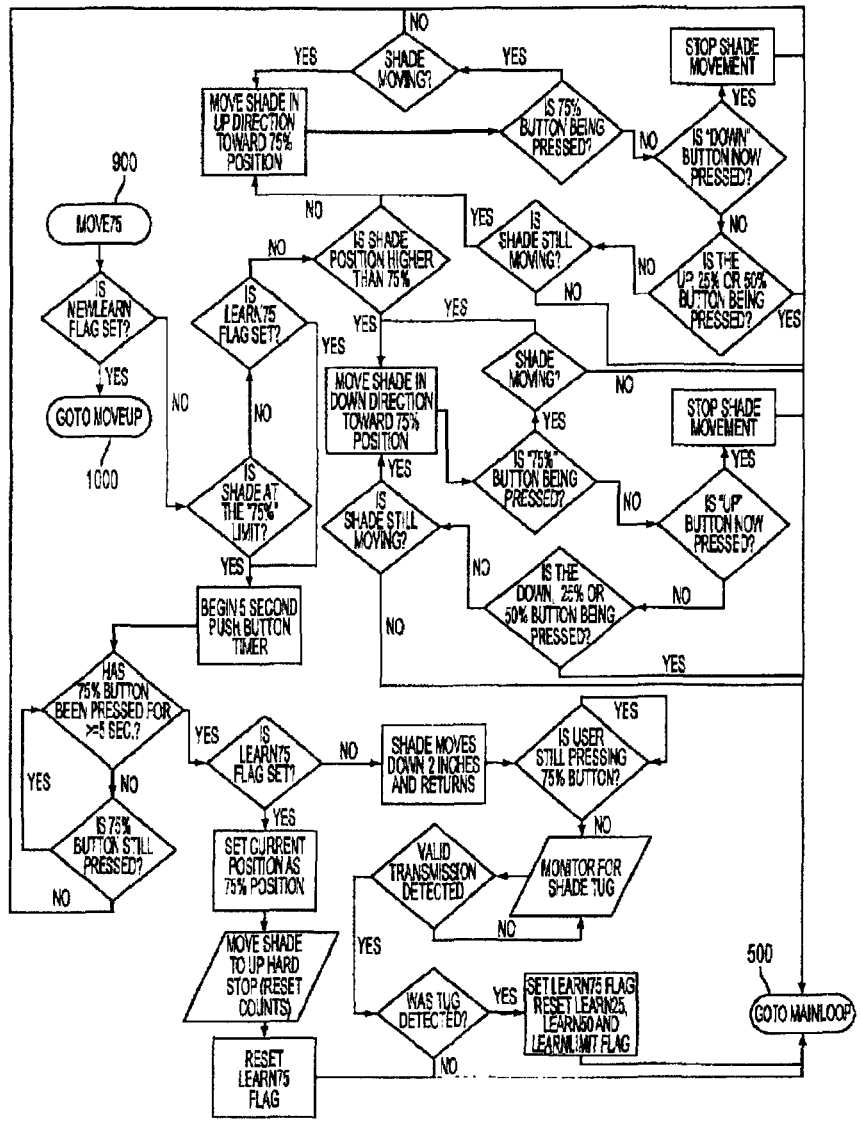
Figure 23:
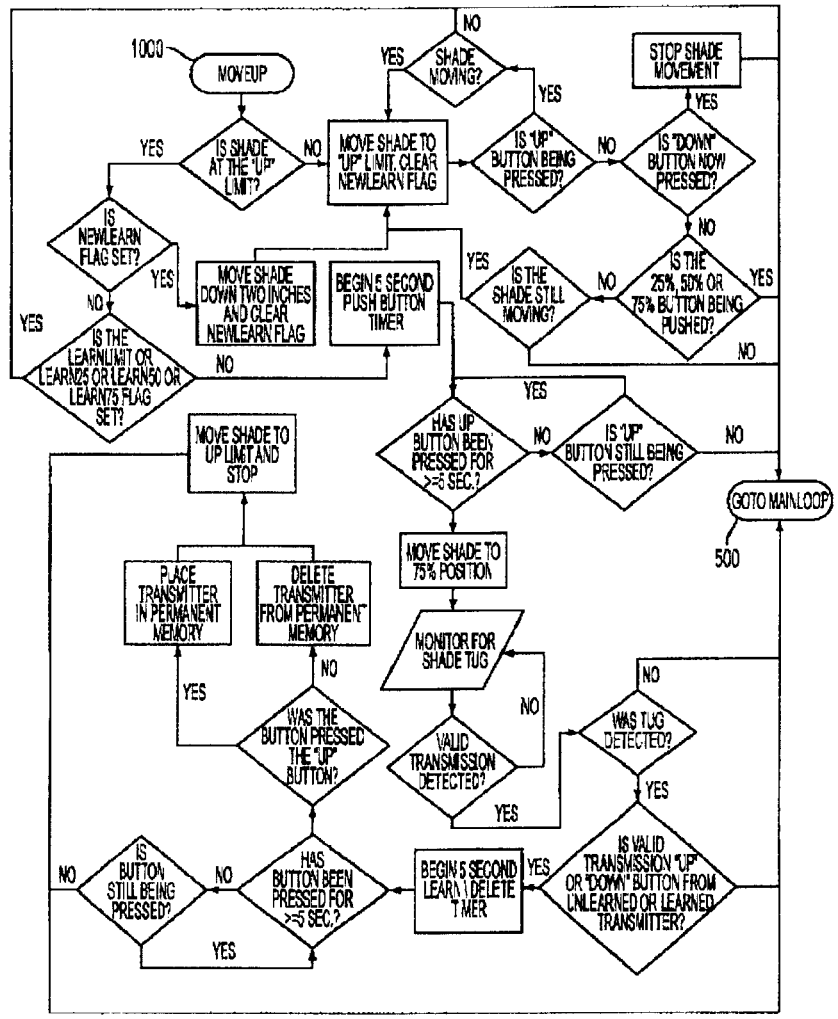
Figure 24:
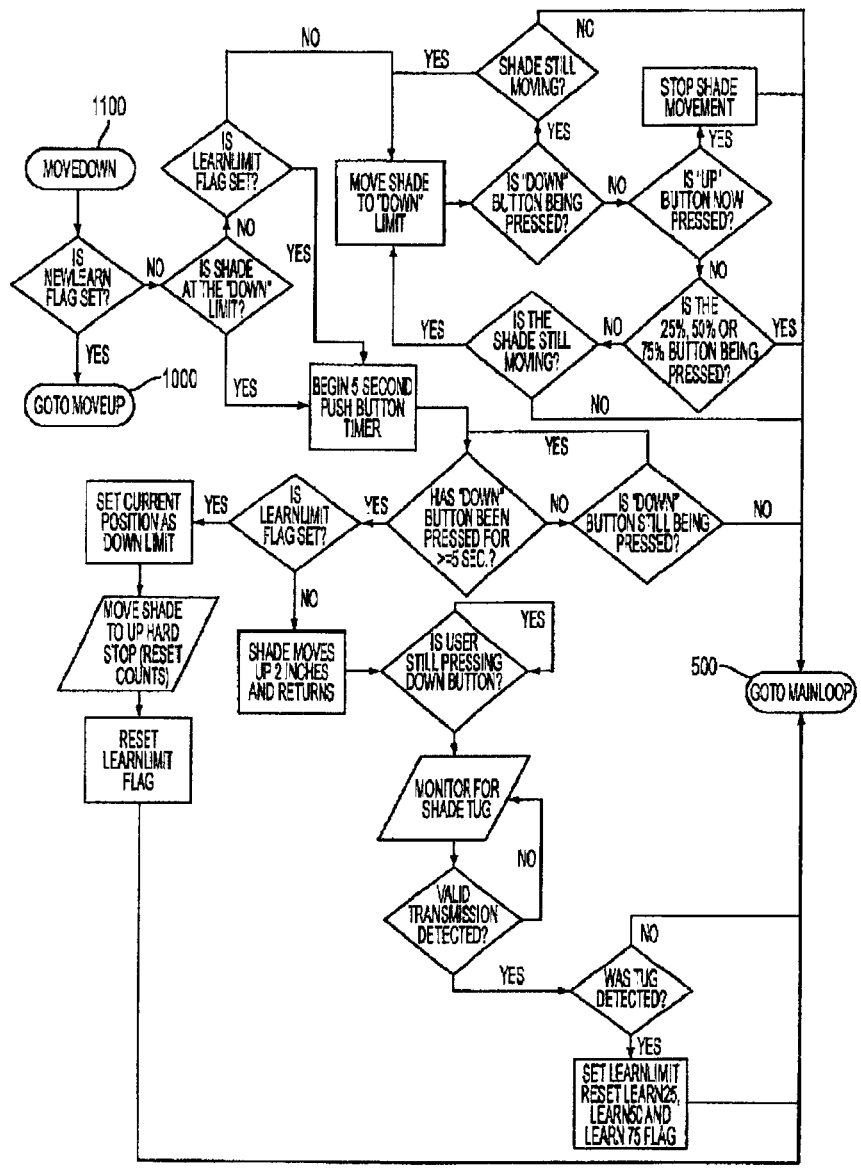
Figure 25:
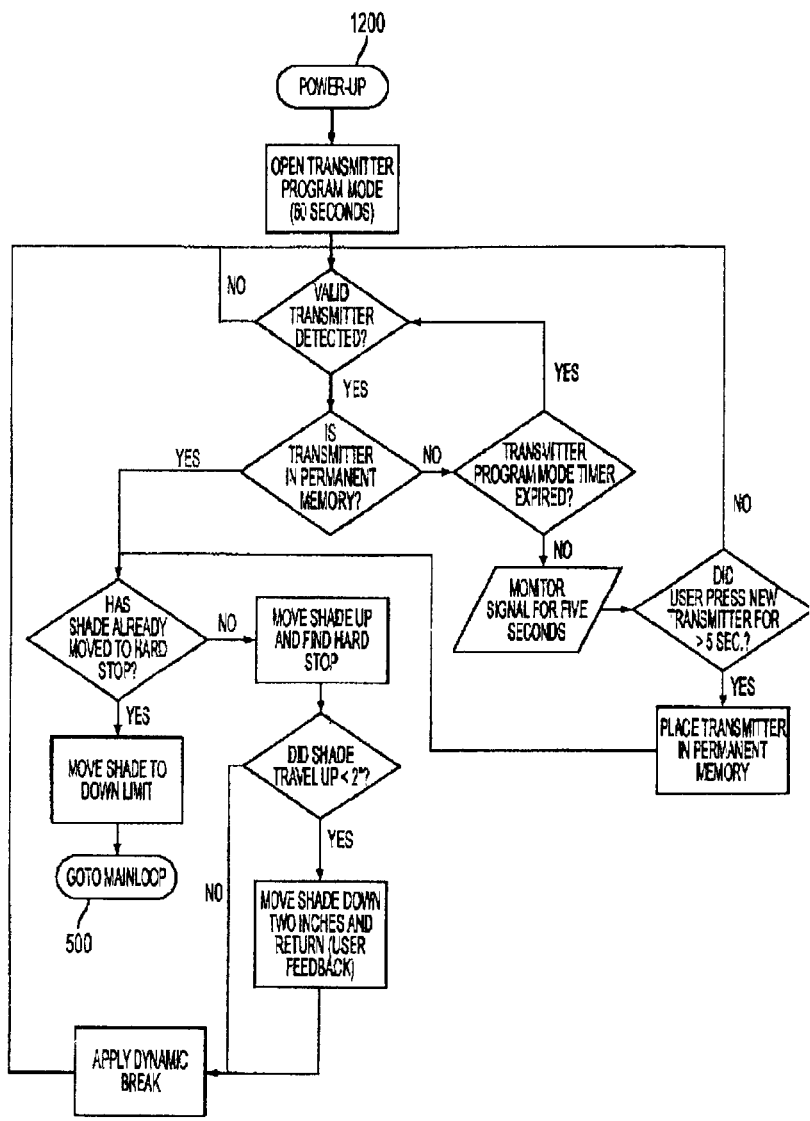

For the preferred embodiment, programming a motorized roller shade 20 to accept commands from a particular remote control depicted in FIGS. 18 and 25, while programming or teaching the motorized roller shade 20 to deploy and retract the shade 22 to various preset or predetermined positions, such as open, closed, 25% open, 50% open, 75% open, etc. is depicted in FIGS. 20 to 24. Other programming methodologies are also contemplated by the present invention.

In other embodiments, a brake may be applied to the motorized roller shade 20 to stop the movement of the shade 22, as well as to prevent undesirable rotation or drift after the shade 22 has been moved to a new position. In one embodiment, the microcontroller connects the positive terminal of the DC gear motor 55 to the negative terminal of DC gear motor 55, using one or more electro-mechanical switches, power FETS, MOSFETS, etc. to apply the brake. In another embodiment, the positive and negative terminals of the DC gear motor 55 may be connected to ground, which may advantageously draw negligible current. In a negative ground system, the negative terminal of the DC gear motor 55 is already connected to ground, so the microcontroller only needs to connect the positive terminal of the DC gear motor 55 to ground. Conversely, in a positive ground system, the positive terminal of the DC gear motor 55 is already connected to ground, so the microcontroller only needs to connect the negative terminal of the DC gear motor 55 to ground.

Once the positive and negative terminals of the DC gear motor 55 are connected, as described above, any rotation of the shade tube 32 will cause the DC gear motor 55 to generate a Voltage, or counter electromotive force, which is fed back into the DC gear motor 55 to produce a dynamic braking effect. Other braking mechanisms are also contemplated by the present invention, such as friction brakes, electro-mechanical brakes, electro-magnetic brakes, permanent-magnet single-face brakes, etc. The microcontroller releases the brake after a manual movement of the shade 22 is detected, as well as prior to energizing the DC gear motor 55 to move the shade 22.

In an alternative embodiment, after the shade 22 has been moved to the new position, the positive or negative terminal of the DC gear motor 55 is connected to ground to apply the maximum amount of braking force and bring the shade 22 to a complete stop. The microcontroller then connects the positive and negative terminals of the DC gear motor 55 together via a low-value resistor, using an additional MOSFET, for example, to apply a reduced amount of braking force to the shade 22, which prevents the shade 22 from drifting but allows the user to tug the shade 22 over long displacements without significant resistance. In this embodiment, the brake is not released after the manual movement of the shade is detected in order to provide a small amount of resistance during the manual movement.

FIGS. 18 to 25 present operational flow charts illustrating preferred embodiments of the present invention. The functionality illustrated therein is implemented, generally, as instructions executed by the microcontroller. FIG. 18 depicts a Main Loop 500 that includes a manual control operational flow path, a remote control operational flow path, and a combined operational flow path. Main Loop 500 exits to various subroutines, including subroutine "TugMove" 600 (FIG. 19), subroutine "Move25" 700 (FIG. 20), subroutine "Move50" 800 (FIG. 21), subroutine "Move75" 900 (FIG. 22), subroutine "MoveUp" 1000 (FIG. 23), subroutine "MoveDown" 1100 (FIG. 24), which return control to Main Loop 500. Subroutine "Power-Up" 1200 (FIG. 25) is executed upon power up, and then exits to Main Loop 500.

One example of a motorized roller shade 20 according to various embodiments of the present invention is described hereafter. The shade tube 32 is an aluminum tube having an outer diameter of 1.750 inches and a wall thickness of 0.062 inches. Bearings 64 and 90 each include two steel ball bearings, 30 mm OD.times.10 mm ID.times.9 mm wide, that are spaced 0.250" apart. In other words, a total of four ball bearings, two at each end of the motorized roller shade 20, are provided.

The DC gear motor 55 is a Buhler DC gear motor 1.61.077.423, as discussed above. The battery tube 82 accommodates 6 to 8 D-cell alkaline batteries, and supplies voltages ranges from 6 V to 12 V, depending on the number of batteries, shelf life, cycles of the shade tube assembly, etc. The shade 22 is a flexible fabric that is 34 inches wide, 60 inches long, 0.030 inches thick and weighs 0.100 lbs/sq. ft, such as, for example, Phifer Q89 Wicker/Brownstone. An aluminum circularly-shaped curtain bar 28, having a diameter of 0.5 inches, is attached to the shade 22 to provide taughtness as well as an end-of-travel stop. The counterbalance spring 63 is a clock spring that provides 1.0 to 1.5 in-lb of counterbalance torque to the shade 22 after it has reached 58 inches of downward displacement. In this example, the current drawn by the Buhler DC gear motor ranges between 0.06 and 0.12 amps, depending on friction.

Turning now to FIGS. 26-28, a schematic view of a window, generally designated 1200 is illustrated, wherein the window 1200 has a blind or shade assembly 1202 mounted thereto having a shade or blind 1204. Referring now specifically to FIG. 26, the blind or shade assembly 1202 has the shade or blind 1024 deployed in a first position whereas FIG. 27 depicts the shade or blind assembly 1202 wherein the shade or blind 1204 is fully deployed to the closed position, covering the window 1200. FIG. 28 depicts the shade or blind assembly 1202 wherein the shade or blind 1204 is in a third, fully open position. The aforementioned figures and corresponding positions will be discussed further in connection with FIGS. 29 and 30.

Figure 29:
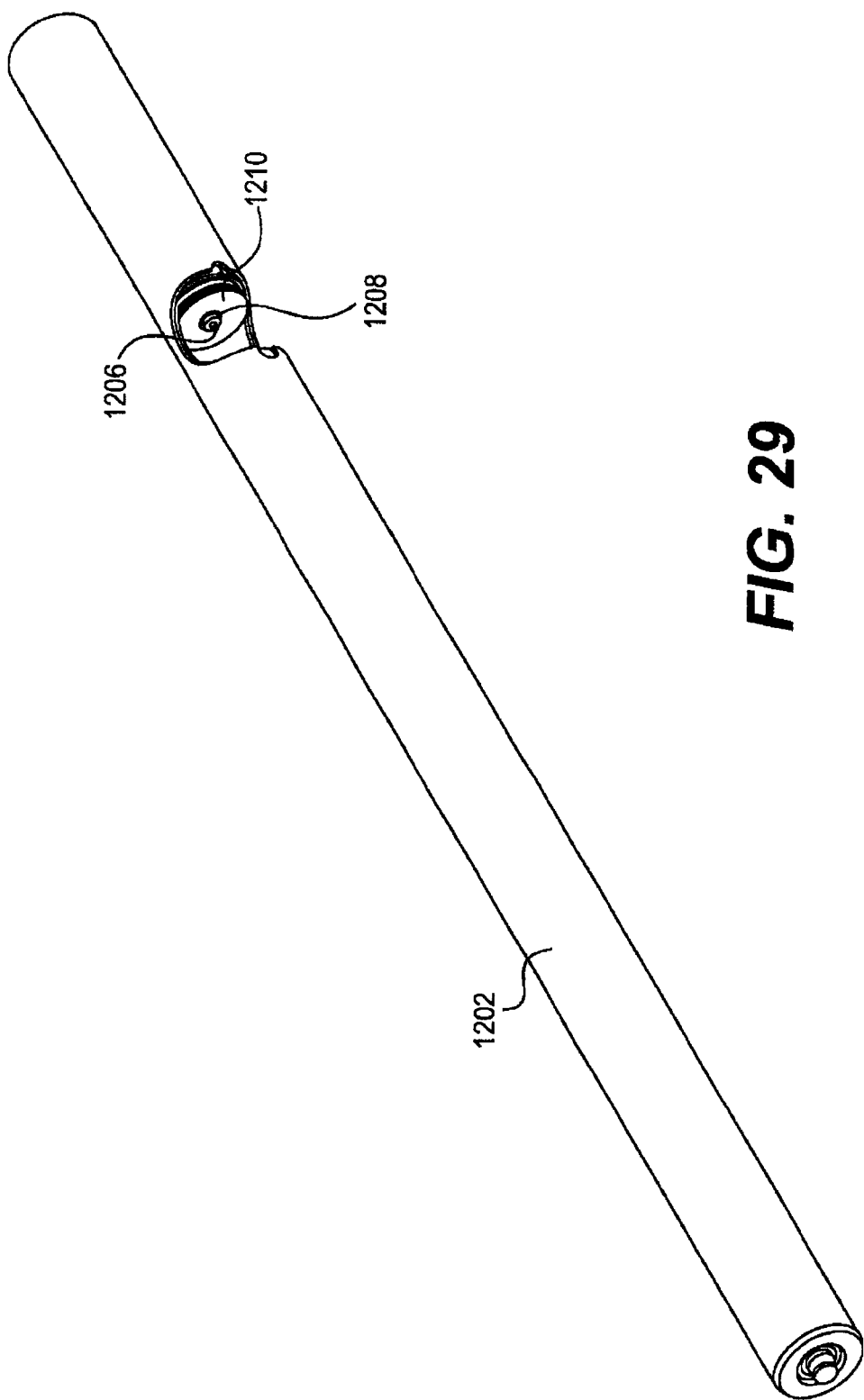
FIG. 29 is a perspective or cutaway view of a roller shade assembly illustrating the FIG. 30 in an enlarged perspective view of the roller shade assembly depicted in FIG. 29.
Figure 30:
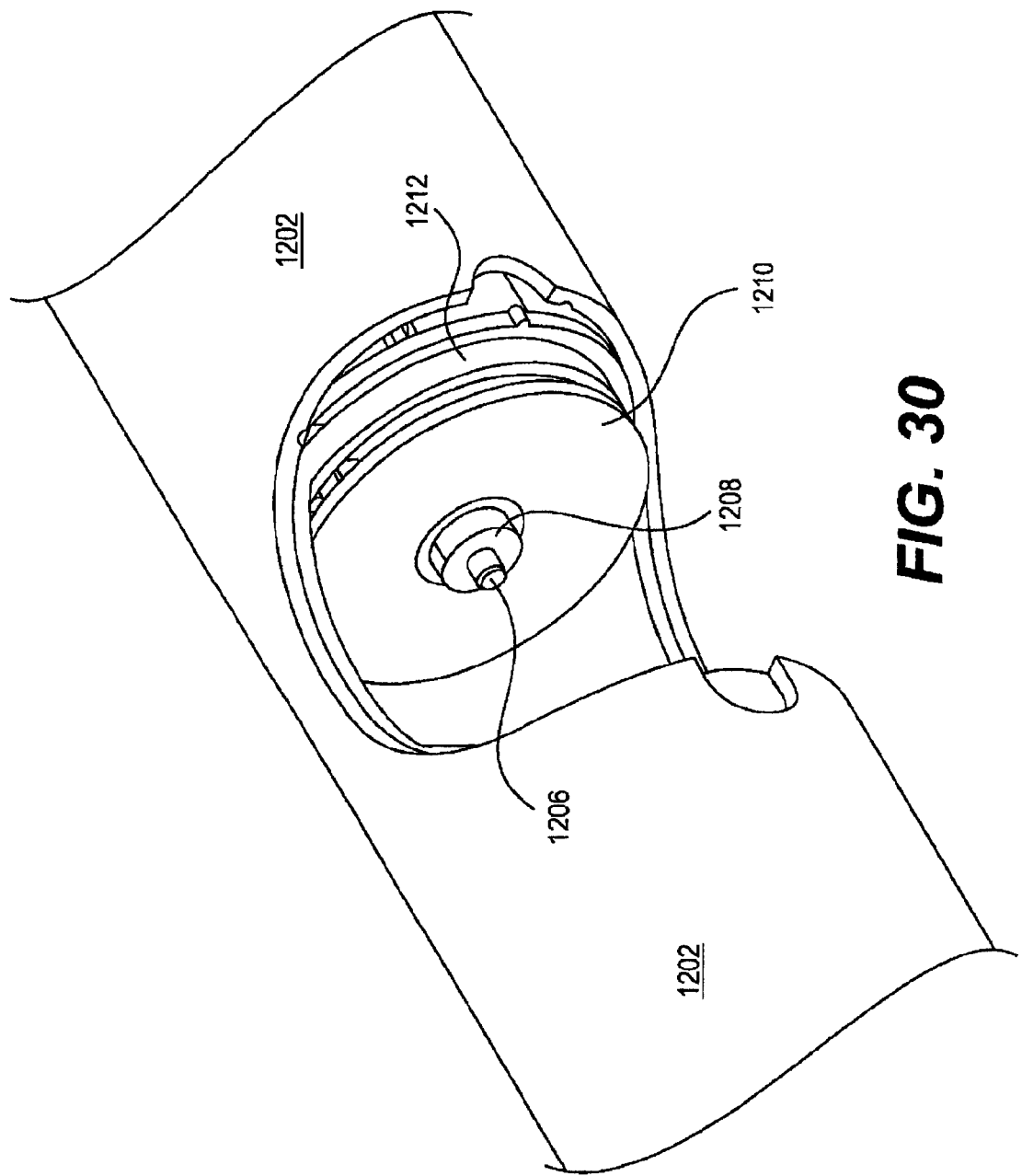
Figure 31:
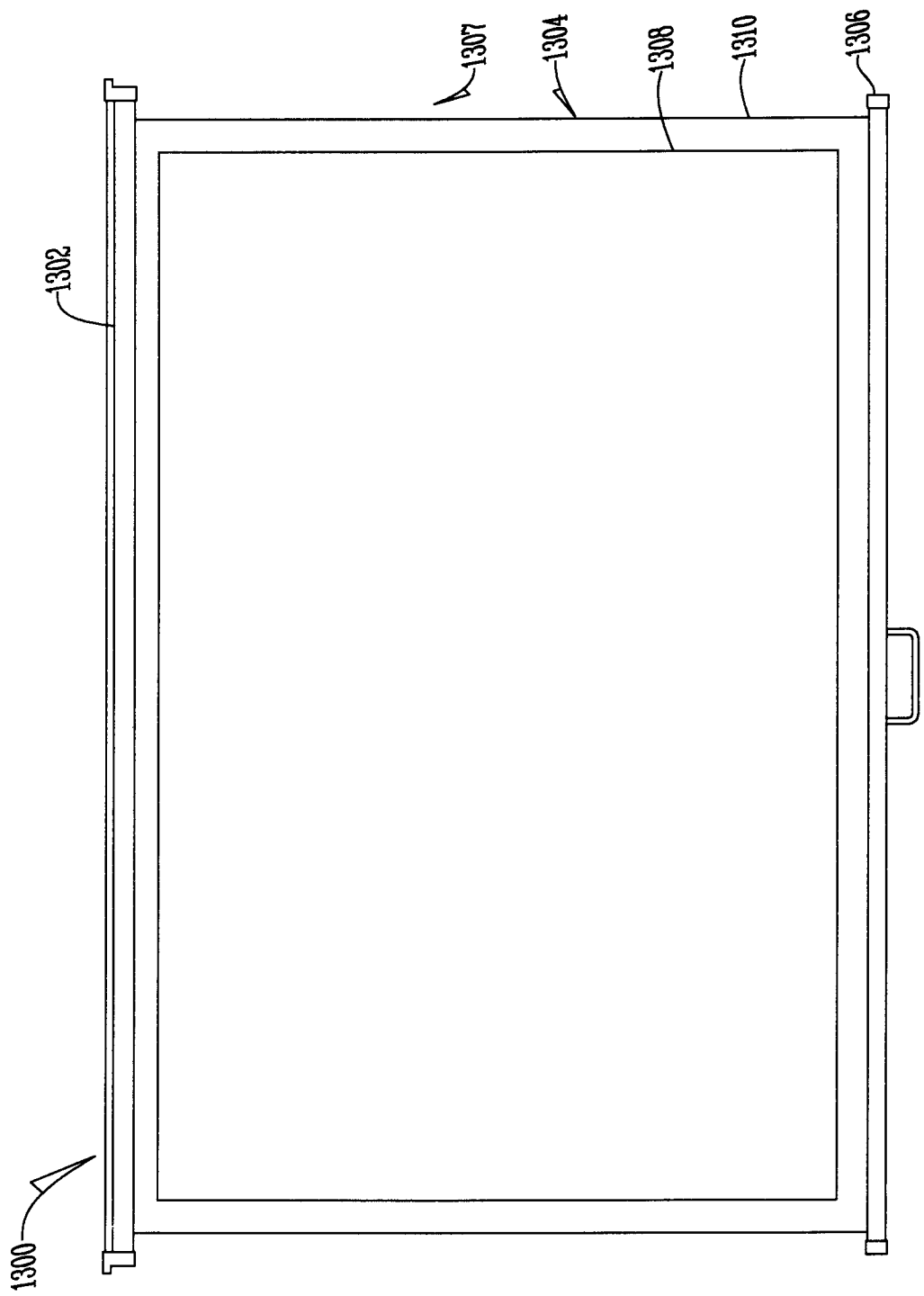
FIG. 31 is an elevation view of a deployable screen system showing the screen material, the housing, the bottom bar among other features of the deployable screen system arrangement.

Turning now to FIGS. 29 and 30, the roller shade or blind assembly 1202 is depicted in accordance with the embodiments of the present invention described herein. As illustrated in FIGS. 29 and 30, the roller or shade assembly 1202 includes a motor (not shown) having an output shaft 1206 extending therefrom. A Hall Effect magnet wheel 1208 is mounted to said output shaft 1206. The roller shade or blind assembly 1202 also comprises a Hall Effect sensor as part of a printed circuit board 1210. Alternatively, the roller shade or blind assembly 1202 may employ a chopper wheel wherein an optical encoder is mounted to the printed circuit board 1210 instead of the above-discussed Hall Effect magnet wheel and sensor. Moreover, the roller shade or blind assembly 1202 may alternatively employ a magnetic reed switch or a potentiometer.

The roller shade or blind assembly 1202 includes a microprocessor (not shown) as previously discussed, which is mounted to a second printed circuit board 1212. The microprocessor is electrically connected to the power supply and the first printed circuit board 1210.

During operation, once the shade or blind assembly 1202 is installed and energized or otherwise powered up, the shade or blind 1204 will be able to move or translate to a predetermined position. One preferred distance is about 12 inches (30.5 cm) but it can be any desired distance/position in the path of travel of the shade or blind 1204, for example as illustrated in FIG. 26. The aforementioned translations of the shade or blind 1204 may be automatic from a time out command after energizing the power supply or a manual movement of the shade or blind 1204, such as a tug, or a depression of a button on a remote transmitter. Once the shade or blind 1204 is deployed to the position as described above, the motorized shade or blind assembly 1202 is now positioned for further user response and input. The user may now manually pull the shade or blind 1204 to the fully closed position as depicted in FIG. 27.

Next, the control unit may proceed to time out and translate of move the shade or blind 1204 to a third or fully open position as depicted in FIG. 28. The aforementioned last movement or translation is typically automatic by means of a countdown timer but alternatively could be initiated by a transmitter or a short tug on the shade or blind 1204. In one embodiment, the described setup would likely be performed each time the power supply is energized and in said embodiment, may occur automatically if for some reason the Hall Effect sensor 1210 lost count causing a hard stop.

The upper limit hard stop, as previously mentioned, at the top of the roller shade travel is utilized to re-sync the encoder count by detecting the upper travel limit. The use of "absolute encoders" is permitted as well as "non-absolute encoders" which must be recalibrated or re-synced to an encoder zero position as desired, in this case the hard stop at the top. Over time, an encoder might become slightly out of sync with the actual shade position causing the shade assembly to not function correctly or as desired. This described occurrence can easily happen when the reed switch is falsely triggered by the encoder magnet rocking or oscillating due to motor and fabric and spring working against each other at some position of travel. One may correct this "out of sync condition" forcing a hard stop every certain amount of cycles to re-sync said encoder. Please note the number of cycles is an arbitrary number and can be any desired or needed value. The aforementioned syncing process is preferred as it is undesirable to take an energy hit by stalling the motor every time the blind or shade 1204 is retracted all the way and it is undesirable to introduce noise. e.g., clank, etc., by having the bottom bar of the blind or shade, for example, hit the hard stop every time the blind or shade 1204 is refracted.

In one example for setting a custom upper limit during the setup, the end user may use a lower starting position for the blind or shade 1204 as one of the intermediate positions. So, for instance, if the end user were to tug on the blind or shade 1204 to propel it to the top, the end user may alternatively stop at an intermediate position to allow for the blind or shade 1204 to be more easily accessible. Since the intermediate positions are programmable, an end user may set the upper height to whatever "artificial top" desired or preferred.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

Motorized Roller Screen Embodiment:

A battery powered, manually operated, tug operated and remote control operated deployable screen system 1300 is presented with respect to FIG. 30. While there are differences between roller shade technology and deployable screen technology, there are substantial similarities. As such, the above-presented teachings and disclosure presented with respect to roller shades 10 are hereby are fully incorporated and applied to the motorized roller screen system 1300 embodiment presented. Accordingly, for purposes of eliminating redundancies, reference is made to previously presented reference numerals for application in the motorized roller screen system 1300 where applicable.

The system 1300 includes a housing 1302. Housing 1302 is formed of any suitable size, shape and design. In one arrangement, housing 1302 serves to contain, hide or cover all other components of the system 1300 when the system 1300 is in a retracted state; whereas in a deployed state screen material 1304 and bottom bar 1306 extends outwardly from housing 1302. In this arrangement, housing 1302 has a slot or opening 1307 in its bottom end through which screen material 1304 and bottom bar 1306 are deployed and retracted.

In this arrangement, housing 1302 serves to mount the system 1300 to a ceiling, wall or other structure for installation purposes. In an alternative arrangement, mounting brackets such as those shown in FIG. 3 as reference numerals 5, 7 are used alone to mount the system 1300 to a wall, ceiling or other structure in an exposed state. In yet another alternative arrangement, mounting brackets such as those shown in FIG. 3 as reference numerals 15, 17 are used for mounting the system 1300 to a wall, ceiling or other structure in association with a fascia 12 and fascia end caps 14 which are connected to the mounting brackets 15, 17 are used to cover the system.

Like the roller shade assembly 10, the deployable screen system 1300 includes a roller tube 32 with a motor/controller unit 40 and a battery tube unit 80 positioned therein, along with all of the related components. Support shafts 60, 88 extend outwardly from each end of the roller tube 32 which are connected to brackets 5, 7 or 15, 17 or housing 1302. Roller tube 32 rotates upon bearings 64, 90 to which stationary support shafts 60, 88 are connected thereby deploying and retracting the screen material 1304.

In some arrangements, the screen material 1304 is made of a single homogenous piece of reflective material 1308, which is generally a white color. In other arrangements, the reflective material 1308 is surrounded or edged by a border material 1310, which is generally made of a non-reflective black or dark color.

Differences between roller shades 10 and deployable screen systems 1300 exist. One difference is that the screen material 1304 is often substantially heavier, denser, thicker and/or more cumbersome than the generally light shade material 22 of a roller shade. Another difference between roller shades 10 and deployable screen systems 1300 is that the picture quality of a deployable screen 1300 is directly dependent on the screen material 1304 being flat. Any deviations in the flatness of the screen material 1304 will directly impact the picture quality. To resolve this issue, the bottom bar 1306 of deployable screens 1300 are often much heavier than the bottom bar 28 of a roller shade 10. A heavier bottom bar 1306 and heavier screen material 1304 causes the deployable screen system 1300 to hang flatter and resist movement (such as from a slight in-room breeze from air conditioning or an open window) over lighter applications.

The combined weight of the heavier screen material 1304 and the heavier bottom bar 1306 presents problems when motorizing the deployable screen system 1300 using only batteries 92. Problems include increased energy consumption required to move the screen material 1304 and the bottom bar 1306. Problems also include maintaining a position of the screen material 1304 and bottom bar 1306 once moved. These problems are easily overcome when an unlimited source of power is used, however when using only battery power, substantial battery life loss is experienced unless proper measures are taken.

One solution is to use counterbalance systems that closely match the weight profile of the screen material 1304 and bottom bar 1306 throughout the length of travel between a fully retracted position and a fully deployed position. Various counterbalance systems have been developed to resolve these issues, such as a torsion spring type counterbalance springs 63 and/or a power springs 65 as are presented herein.

Further information is presented with respect to various springs and/or variable negative gradient springs in Applicant's related U.S. Application Ser. No. 61/823,623 filed on May 15, 2013 entitled Variable Gradient Torque Springs For Use In An Architectural Covering which is hereby fully incorporated by reference herein, along with any and all related patent applications. In one arrangement, the springs presented in this application are utilized in the deployable screen system 1300. These springs allow for closer matching of the counterbalance torque profile to the torque profile of the deployable screen system between the deployed position and the retracted position.

Another counterbalancing system that is useful with deployable screen systems 1300 is the system presented in Applicant's related U.S. application Ser. No. 13/539,763 filed on Jul. 2, 2012 entitled Pre-Assembled and Pre-Tensioned Shade With Indexing Gear Tensioner which is hereby fully incorporated by reference herein, along with any and all related patent applications. In one arrangement, the bearing housing, gear tensioner and counterbalance assembly presented in this application are utilized in the deployable screen system 1300. The use of these systems allows for the installation of a pre-tensioned counterbalance which helps to hold up the heavier screen material 1304 and bottom bar 1306. This avoids the need to pre-tension the counterbalance assembly in the field. Another feature of using these systems is that it provides an internal stop that is used to set a stop at the fully deployed position and a fully retracted position. This avoids the need to use an external stop, such as that presented on brackets 5, 7 or 15, 17.

Yet another counterbalancing system that is useful with deployable screen systems 1300 is the system presented in Applicant's related U.S. application Ser. No. 13/548,767 filed on Jul. 13, 2012 entitled A Shade With A Shear Pin And Method For Pre-tensioning A Shade which is hereby fully incorporated by reference herein, along with any and all related patent applications. In one arrangement, the counterbalance spring assembly presented in this application is utilized in the deployable screen system 1300. The use of these systems allows for the installation of a pre-tensioned counterbalance spring assembly which helps to hold up the heavier screen material 1304 and bottom bar 1306. This avoids the need to pre-tension the counterbalance assembly in the field.

Due to the great weight of the screen material 1304 and the bottom bar 1306 in deployable screen systems 1300, the need for springs, as well as the need for pre-tensioned springs in the counterbalance assembly is substantial. The counterbalance systems, and springs presented in these incorporated-by-reference patent applications provide solutions to the counterbalancing problems experienced in the prior art.

Extended Battery Life:

As is presented herein, one method of extending the battery life, besides utilizing the proper gear ratio and a closely balanced counterbalance system, is by essentially under-powering the DC gear motor 55. By under-powering the DC gear motor 55 the system harnesses the benefits of Peukert's Law.

Peukert's law, presented by the German scientist W. Peukert in 1897, expresses the capacity of battery in terms of the rate at which it is discharged. As the rate increases, the battery's available capacity decreases.

Manufacturers rate the capacity of a battery with reference to a discharge time. For example, a battery might be rated at 100 A·h (Amp Hours) when discharged at a rate that will fully discharge the battery in 20 hours. In this example, the discharge current would be 5 amperes. If the battery is discharged in a shorter time, with a higher current, the delivered capacity is less. Peukert's law describes an exponential relationship between the discharge current (normalized to some base rated current) and delivered capacity (normalized to the rated capacity), over some specified range of discharge currents. If the exponent constant was one, the delivered capacity would be independent of the current. For a lead-acid battery however, the value of k is typically between 1.1 and 1.3. It generally ranges from 1.05-1.15 for VRSLAB AGM batteries, 1.1-1.25 for gel, and 1.2-1.6 for flooded batteries. The Peukert constant varies according to the age of the battery, generally increasing with age. Application at low discharge rates must take into account the battery self-discharge current. At very high currents, practical batteries will give even less capacity than predicted from a fixed exponent. The equation does not allow for the effect of temperature on battery capacity.

For a one-ampere discharge rate, Peukert's law is often stated as:

$$C_P = I^k t$$

where:

$C_P$ is the capacity at a one-ampere discharge rate, which must be expressed in A·h.

I is the actual discharge current (i.e. current drawn from a load).

t is the actual time to discharge the battery, which must be expressed in h.

The capacity at a one-ampere discharge rate is not usually given for practical cells. It is useful to reformulate the law to a known capacity and discharge rate:

$$t = H\left(\frac{C}{IH}\right)^k$$

where:

H is the rated discharge time, in (hours).

C is the rated capacity at that discharge rate, in (Ampere-hours).

I is the actual discharge current, in (Amps).

k is the Peukert constant, (dimensionless).

t is the actual time to discharge the battery, in (hours).

Using the above example, if the battery has a Peukert constant of 1.2 and it is discharged at a rate of 10 amperes, it would be fully discharged in time $$20\left(\frac{100}{10 \cdot 20}\right)^{1.2}$$

which is approximately 8.7 hours. It would therefore dispense only 87 ampere hours rather than 100.

Peukert's law can be written as:

$$It = C\left(\frac{C}{IH}\right)^{k-1}$$

giving It which is the effective capacity at the discharge rate I.

Harnessing the power of Peukert's Law, various combinations of the deployable screen system 1300 are contemplated wherein the DC gear motor 55 is essentially underpowered by the batteries. In one arrangement, DC gear motor 55 has a rated voltage, such as 12 volts or 24 volts or the like. Similarly, the batteries, each have their own rated maximum average voltage, and when a plurality of batteries are stacked in series, these rated maximum average voltages are added to one another. It is well known that standard rechargeable D-cell Nickel Metal Hydride batteries have a rated maximum average voltage of approximately 1.2 volts, whereas standard non-rechargeable D-cell Alkaline batteries have a rated maximum average voltage of approximately 1.6 volts. Various arrangements are hereby contemplated wherein the maximum average voltage produced by the batteries is less, or substantially less than the rated voltage of the DC gear motor 55. These combinations are paired with appropriate gearing ratios. As less power is supplied to a motor 55, the slower it rotates, and therefore battery life can be extended through application of Peukert's law. When the motor 55 rotates slower, less noise is generated and a lower gear ratio can be used, which allows for easier manual movement of the screen material 1304.

Chart of: Gear Ratios—Batteries—Maximum Average Battery Voltages—and Ratio of Maximum Average Battery Voltages to Motor Rating for a 24 Volt Rated Motor:

| Gear Ratio: | # of D-Cells | Nickel Metal Hydride (1.2 V) Maximum Average Voltage | Alkaline (1.6 V) Maximum Average Voltage | Max. Avg. V. to Motor Rating Ratio |
|---|---|---|---|---|
| 120:1 | 12 batteries | 14.4 Volts | 19.2 Volts | 19.2 V/24 V = 80% |
| 90:1 | 10 batteries | 12 Volts | 16 Volts | 16 V/24 V = 66% |
| 72:1 | 8 batteries | 9.6 Volts | 12.8 Volts | 12.8 V/24 V = 53.3% |
| 40:1 | 6 batteries | 7.2 Volts | 9.6 Volts | 9.6 V/24 V = 40% |
| 22:1 | 4 batteries | 4.8 Volts | 6.4 Volts | 6.4 V/24 V = 26% |

As can be seen from the chart, the maximum average voltage of the battery stacks (19.2V, 16V, 12.8V, 9.6V, 6.4V) is substantially less than the rated voltage of the motor (24V). For the above identified combinations, the ratio of Maximum Average Voltage for the batteries to the Rated Voltage of the motor is 80%, 66%, 55.3%, 40%, and 26% respectively. While a 24 volt motor and D-cell batteries having an maximum average rated voltage of 1.6 volts are hereby contemplated for use, the various arrangements of the batteries and the motor can be changed, while still harnessing the benefit of Peukert's law, that is supplying a maximum average voltage to the motor that is less than the rated voltage of the motor. This slows the rotation of the motor, extends the battery life, reduces noise, lowers the gear ratio, reduces back drive, and allows for easier manual movement.

Method of Operating:

Again, while substantial similarities exist between roller shades 10 and deployable screen systems 1300, one substantial difference is the method of operation. It is often desirable to use a roller shade 10 in a semi-deployed state, or, said another way, in a position somewhere between fully opened and fully closed. Therefore, intermediary stop positions are often desirable in roller shades.

In contrast, deployable screen systems 1300 are rarely if ever desired to be in any other position than a fully retracted position or a fully deployed position. Accordingly, in one arrangement, deployable screen system 1300 is designed to stop rotation of roller tube 32 at a fully retracted position, and a fully deployed position. In one arrangement, these positions are programmed into the motor/controller unit 40. In another arrangement, one or both of these positions are defined mechanically. Mechanical stops include a hard an external stop and an internal hard stop. One example of an external hard stop includes a as a flange arrangement on the brackets 5, 7, 15, 17, that force bottom bar 1306 into the roller tube 32 thereby preventing further upward motion. One example of an internal hard stop includes a gear stop and corresponding housing stop within a gear tensioner and counterbalancing assembly such as is presented with respect to Applicant's U.S. application Ser. No. 13/539,763.

With the fully deployed position and fully retracted position defined, either through programming, mechanical stops, or a combination thereof, the screen material 1304 is moveable from the fully retracted position to the fully deployed position, and vice versa, from a fully deployed position to a fully retracted position merely by a tug. That is, when a tug (a small manual movement of the screen material 1304, or, said another way, a manual movement of the screen material 1304 that is less than a maximum displacement) is sensed by the motor/controller unit 40 when the screen material 1304 is positioned in a fully retracted position or a fully deployed position, the motor/controller unit 40 activates and moves the screen material 1304 to the opposite position. That is, when a tug is sensed when the screen material is in a fully deployed position, the motor/controller unit 40 moves the screen to a fully retracted position. Oppositely, when a tug is sensed when the screen material is in a fully retracted position, the motor/controller unit 40 moves the screen to a fully deployed position. In one arrangement, to allow a user to easily grasp bottom bar 1306, the bottom bar 1306 is positioned so as to extend slightly out of housing 1302 slightly, so it can easily be grabbed. In this way, ease of operation is accomplished.

Manual movement is also allowed by the arrangement presented. One result of the configuration presented, wherein a low amount of power (such as approximately 9.6V or 4.8V) is supplied to DC gear motor 55 (such as approximately a 24V DC Motor) with a low gear ratio (such as approximately a 40:1 gear ratio) there is a low amount of resistance to manually moving the screen material 1304, or said another way, low back drive is accomplished. This low back drive allows for a user to easily manually move (pull the screen material 1304 a distance greater than a tug) the screen material 1304 to a desired position. Manual movement is also assisted by the close balancing of the torque profile of the screen material 1304 and bottom bar 1306 with the torque profile of the counterbalance spring 63 and/or counterbalance assembly which reduces the amount of force required to move the screen material 1304 and bottom bar 1306.

Wireless control of the deployable screen system 1300 is also provided. In one arrangement an antenna is connected to motor/controller unit 40. Any form of an antenna is hereby contemplated for use, such as common monopole antennas, or meandering monopole antennas. Further information is presented with respect to the use of various antennas, including fractal antennas, in Applicant's related U.S. application Ser. No. 13/286,542 filed on Nov. 1, 2011 entitled Motorized Roller Shade Or Blind Having An Antenna And Antenna Cable Connection which is hereby fully incorporated by reference herein, along with any and all related patent applications. In one arrangement, the antenna is positioned on or in an open end of the roller tube 32.

The inclusion of an antenna in the deployable screen system 1300 allows for the reception of wireless control signals for the control and operation of the deployable screen system 1300. These wireless control signals can be transmitted by any wireless device such as a conventional remote control, a cell phone or a smart phone, a computer connected to the internet, a computer having wireless capability such as Wi-Fi, a wireless router or modem with or without a connection to the internet, a bridge device which converts a wireless signal of one form to a wireless signal of another form (such as QMotion's QSync device), a voice control module (such as is presented in Applicant's related U.S. Application Ser. No. 61/807,846 filed on Apr. 3, 2013, entitled System And Method For Wireless Voice Actuation Of Motorized Window Coverings which is hereby fully incorporated by reference herein, along with any and all related patent applications), or any other wireless transmission device or any combination of these devices. When a wireless control signal is transmitted within effective distance with effective strength, it is received by the antenna, transmitted to the motor/controller unit 40, interpreted and thereafter the DC gear motor 55 is actuated to either deploy or retract the deployable screen system 1300.

From the above discussion it will be appreciated that a battery powered, wirelessly controlled, manually operated and tug controlled deployable screen system is presented that improves upon the state of the art.

Specifically, the deployable screen system: does not require hard wiring to an external power source; provides long battery life; is well balanced/counterbalanced; is operable by way of a tug and by way of manual movement; operates by way of wireless control; has a motor positioned in the rotating tube; has at least one battery positioned in the rotating tube; allows for easy removal and replacement of the batteries; is inexpensive; has a long useful life; is durable; has a simple design; is simple to use; has a minimum number of parts; operates quietly; among countless other improvements and advantages.

It will be appreciated by those skilled in the art that other various modifications could be made to the device without parting from the spirit and scope of this invention. All such modifications and changes fall within the scope of the claims and are intended to be covered thereby.

What is claimed is:

1. A method of operating a deployable screen system, the steps comprising:
    providing a roller tube;
    connecting screen material to the roller tube;
    positioning a motor and a controller within the roller tube;
    connecting at least one battery with the motor and the controller;
    sensing a first tug when the screen material is in a retracted position; and
    moving the screen material to a deployed position in response to sensing the first tug;
    wherein the roller tube rotates around a pair of non-rotating support shafts extending outwardly from opposing ends of the roller tube.

2. The method of claim 1 wherein the at least one battery is positioned within a battery tube assembly.

3. The method of claim 1 further comprising the step of positioning a counterbalance assembly within the roller tube.

4. The method of claim 3 wherein the counterbalance assembly includes a counterbalance spring.

5. The method of claim 4 wherein the counterbalance spring is a torsion spring, a clock spring, or a power spring.

6. The method of claim 1 further comprising positioning a pre-tensioned counterbalance assembly within the roller tube.

7. The method of claim 1 further comprising the step of positioning a stop within the roller tube that stops rotational movement of the roller tube.

8. The method of claim 7 wherein the stop is a gear stop which engages a housing stop.

9. The method of claim 1 further comprising the step of moving the screen material manually by displacing the screen material a distance greater than a tug distance.

10. The method of claim 1 further comprising the step of sensing a second tug when the screen material is in the deployed position and moving the screen material to a retracted position in response thereto.

11. The method of claim 1 wherein when the roller tube rotates so rotates the motor.

12. The method of claim 1 wherein when the roller tube rotates so rotates the at least one battery.

13. The method of claim 1 further comprising the step of connecting a fractal antenna to the controller.

14. The method of claim 1 further comprising the step of positioning a fractal antenna adjacent an open end of the roller tube.

15. The method of claim 1 further comprising the step of moving the screen material in response to receiving a wireless control signal.

16. A method of operating a deployable screen system, the steps comprising:
    providing a roller tube;
    connecting screen material to the roller tube;
    positioning a motor and a controller within the roller tube;
    connecting at least one battery with the motor and the controller;
    sensing a first tug when the screen material is in a deployed position; and
    moving the screen material to a retracted position in response to sensing the first tug;
    wherein the roller tube rotates around a pair of non-rotating support shafts extending outwardly from opposing ends of the roller tube.

17. The method of claim 16 further comprising the step of positioning a counterbalance spring within the roller tube.

18. A deployable screen system, comprising:
    a roller tube extending a length between a first end and a second end;
    screen material connected to the roller tube;
    a motor and a controller positioned within the roller tube;
    at least one battery positioned within the roller tube;
    a first support shaft extending outwardly from the first end;
    a second support shaft extending outwardly from the second end;
    wherein the screen material is deployed and retracted by rotation of the roller tube; and
    wherein the roller tube rotates around the non-rotating first support shaft and the non-rotating second support shaft.

19. The deployable screen system of claim 18 further comprising wherein when the roller tube rotates so rotates the motor, the controller and the at least one battery.

20. A deployable screen system, comprising:
    a roller tube;
    screen material connected to the roller tube;
    a motor and a controller positioned within the roller tube;
    at least one battery electrically connected to the motor and controller;
    a counterbalance assembly positioned within the roller tube;
    wherein the counterbalance assembly includes at least one counterbalance spring; and
    wherein the counterbalance assembly is pre-tensioned;
    wherein the roller tube rotates around a non-rotating first support shaft and a non-rotating second support shaft.

21. A deployable screen system, comprising:
    a roller tube;
    screen material connected to the roller tube;
    a motor and a controller connected to roller tube;
    at least one battery electrically connected to the motor and the controller; and
    wherein the deployable screen system is operated by a tug, manual movement and wireless control;
    a counterbalance assembly positioned within the roller tube;
    wherein the counterbalance assembly includes at least one counterbalance spring; and wherein the counterbalance assembly is pre-tensioned.

* * * * *